(12) United States Patent
Lowell et al.

(10) Patent No.: US 12,717,063 B2
(45) Date of Patent: Aug. 25, 2026

(54) SYSTEM AND METHOD FOR IMPROVED GEOGRAPHICAL DATA INTERPRETATION

(71) Applicant: Foster Findlay Associates Limited, Newcastle upon Tyne (GB)

(72) Inventors: James Lowell, Durham (GB); William Thormont, Sunderland (GB); Dimitrios Sakkos, Amaliada (GR)

(73) Assignee: Foster Findlay Associates Limited, Newcastle upon Tyne (GB)

( * ) Notice: Subject to any disclaimer, the term of this patent is extended or adjusted under 35 U.S.C. 154(b) by 1026 days.

(21) Appl. No.: 17/904,235

(22) PCT Filed: Feb. 16, 2021

(86) PCT No.: PCT/GB2021/050368
§ 371 (c)(1),
(2) Date: Aug. 15, 2022

(87) PCT Pub. No.: WO2021/165660
PCT Pub. Date: Aug. 26, 2021

(65) Prior Publication Data

US 2023/0093005 A1 Mar. 23, 2023

(30) Foreign Application Priority Data

Feb. 18, 2020 (GB) ...................................... 2002225

(51) Int. Cl.
*G01V 20/00* (2024.01)
*G01V 1/30* (2006.01)
(Continued)

(52) U.S. Cl.
CPC .............. *G01V 20/00* (2024.01); *G01V 1/301* (2013.01); *G01V 1/302* (2013.01); *G01V 1/345* (2013.01); *G06N 3/082* (2013.01); *G01V 2210/62* (2013.01)

(58) Field of Classification Search
CPC ........ G01V 20/00; G01V 1/301; G01V 1/302; G01V 1/345; G01V 2210/62; G06N 3/082;
(Continued)

(56) References Cited

U.S. PATENT DOCUMENTS

2004/0202368 A1* 10/2004 Lee ......................... G06T 7/143
382/173
2017/0337687 A1 11/2017 Wang et al.
2019/0391295 A1* 12/2019 Salman .................. G01V 20/00

FOREIGN PATENT DOCUMENTS

WO WO 2009/126951 10/2009
WO WO 2018/026995 2/2018
(Continued)

OTHER PUBLICATIONS

Gupta, Harshit, et al. "Deep learning-based automatic horizon identification from seismic data." SPE Annual Technical Conference and Exhibition?. SPE, 2019. (Year: 2019).*

*Primary Examiner* — John E Johansen
(74) *Attorney, Agent, or Firm* — Workman Nydegger

(57) ABSTRACT

A computer-implemented method is provided for interpreting geophysical data utilising an Artificial Neural Network (ANN), performed by electronic operations executed by a computing device, comprising: performing a training processing step on at least one training-data set, comprising the steps of: (a) generating a first label-data by segmenting said at least one training-data set into at least a first region, representing a known first region having at least one identified geological feature, and/or a second region, representing a known second region having at least one unidentified geological feature, and a third region, representing an unknown region; (b) generating a first ANN model output for a dynamically adaptable Region of Interest (ROI) of said first label-data, said dynamically adaptable ROI including said first and/or second region; (c) generating an updated label-data by selecting at least a first portion of any one of said first, second and third region, and assigning and
(Continued)

appending at least said first portion to any one of said first, second and third region; (d) generating an updated ANN model output for an updated dynamically adaptable ROI of said updated label-data; (e) repeating steps (c) and (d) until a predetermined condition is met, providing a final ANN model output; and then applying said final ANN model output to a target-data set utilising said ANN, generating a desired output data.

16 Claims, 17 Drawing Sheets

(51) Int. Cl.
*G01V 1/34* (2006.01)
*G06N 3/082* (2023.01)

(58) Field of Classification Search
CPC .... G06N 3/045; G06N 3/0464; G06N 3/0895; G06N 3/09; G06N 3/096
USPC ........................................................ 703/10, 6
See application file for complete search history.

(56) References Cited

FOREIGN PATENT DOCUMENTS

| | | |
|---|---|---|
| WO | WO 2018/031051 | 2/2018 |
| WO | WO 2018/148492 | 8/2018 |
| WO | WO 2019/036144 | 2/2019 |

* cited by examiner (a)

(b)

Convolution Block:
Convolution ->
Normalisation -> ReLu

Feature Fusion:
$w_2/_{i1} + w_2/_{i2}$

Max Pooling:

UpSampling Block:
Transpose Convolution ->
Normalisation -> ReLu ->
Convolution -> Normalisation -> ReLu (a)

(b)

(a)

(b)

(c)

(d)

(e)

SYSTEM AND METHOD FOR IMPROVED GEOGRAPHICAL DATA INTERPRETATION

CROSS-REFERENCE TO RELATED APPLICATIONS

The present application is a 35 U.S.C. § 371 U.S. National Stage of International Application No. PCT/GB2021/050368, filed on Feb. 16, 2021, which claims priority to Great Britain Patent Application No. 2002225.7, filed Feb. 18, 2020, the entire content of each of which is incorporated herein by reference.

The present invention generally relates to the use and interpretation of geophysical data to increase understanding of the subsurface of the earth. Furthermore, the invention is applicable to the field of oil and gas exploration and development, and in particular, to the field of computer aided exploration for hydrocarbons using geophysical data, such as, for example, seismic data of the earth's subsurface. Even more particularly, the present invention relates to an at least partially automated interpretation of geophysical data utilising Artificial Neural Networks (ANN). The invention supports any geological feature which can be represented in any form in 3D space, including but not restricted to faults, horizons and geobodies. The disclosed example is concerned with the prediction of faults within seismic data.

INTRODUCTION

A representation of the earth's subsurface can be obtained by undertaking a geophysical survey which may collect data from above or below the earth's surface from aerial, orbital or marine platforms and may use a variety of sensing instruments. Types of geophysical surveys include but are not restricted to Seismic, Ground Penetrating Radar, Magnetic, Radiometric, Gravity, Induced Polarity (IP) and Electromagnetic (EM) Surveys. In the oil and gas industry geophysical data, such as, for example, data produced by seismic prospecting and other similar techniques, are commonly used to aid in the search for and evaluation of subterranean hydrocarbon deposits. As an example, prospecting operations may include the three basic stages of (i) data acquisition, (ii) data processing and (iii) data interpretation. The success of the prospecting operation generally depends on satisfactory completion of (i), (ii) and (iii). For example, a seismic source may be used to generate an acoustic signal that propagates into the earth and that is at least partially reflected by subsurface reflectors (e.g. boundaries between different subterranean layers). The reflected signals are then detected and recorded, e.g. by an array of seismic receivers located at or near the surface of the earth, in an overlaying body of water (e.g. offshore exploration), or at known depths of boreholes.

FIG. 1, for example, shows a typical setup of offshore seismic surveys, where a large seismic survey vessel 10 is used to tow acoustic receivers 12, also known as streamers, suspended below the water surface, carrying hydrophones (not shown). During data acquisition, sound waves 14 are transmitted from the vessel 10 using, for example, compressed air guns 16 and which travel down through the seabed and reflect back from the different layers (strata) of rock 18, 20, 22. The reflected sound waves 14 are then received by the hydrophones (not shown) located along the seismic streamers which, when processed, can be used to provide a visual representation (e.g. 2D, 3D) of the substrata. Typical seismic traces of such reflections (amplitudes) are illustrated in FIG. 2. The data shown has been migrated, i.e. the amplitudes of the traces have been moved to their true subsurface position (depth) so as to eliminate any offset between the source and the receiver.

Further, for production monitoring, 4D seismic data sets (i.e. 3D seismic data acquired at different times over the same area to assess changes in a hydrocarbon reservoir with time) are increasingly used. The geological significance of seismic data is determined through seismic interpretation, where seismic interpreters use highly specialised interpretation tools and procedures (structured as so called 'workflows') in order to depict geological features, such as, for example, faults, horizons and geobodies, thereby, helping to identify and map likely hydrocarbon reservoirs.

Faults in particular can be the cause for trapping hydrocarbons but may also prompt complications for field development (e.g. due to reservoir fragmentation). Consequently, interpreters try to understand hydrocarbon migration pathways from the source rock to the reservoir by mapping faults and fault networks, as well as, by defining horizons, i.e. the reflectors (or seismic events) that represent a change in rock properties (e.g. seismic velocity and density) across a boundary between two layers of rock, because oil and gas accumulations are often found in subtle stratigraphic traps or structural highs.

(i) Seismic Interpretation

In order to assist the interpreter and speed up the interpretation process, a number of automated or semi-automated techniques have been developed attempting to auto-track geological features from seismic data. For example, 3D auto-tracking is a useful tool for capturing faults, horizons, as well as, geobodies from largely unambiguous data.

However, when addressing more challenging seismic data, interpreters often have to revert back to traditional methods, such as, manual or semi-automated 2D tracking, where every n inline, crossline or time slice is interpreted.

The traditional approach of manually picking faults, horizons and geobodies on 2D slices can be effective for building a conceptual model of the geology, as well as, controlling the quality of interpretation whilst 'picking'. Moreover, the conventional workflow may also be qualitatively enhanced by incorporating seismic attributes and blended spectral decomposition volumes, so as to highlight the geological structure within a seismic data set.

Seismic attributes may be generated by extracting or deriving a quantity from seismic data that can be analysed in order to enhance features that may appear more subtle in a traditional seismic image. For example, blended spectral decomposition may be used to allow spatially co-registered visualisation of three different volumetric magnitude responses that are computed using frequency decomposition techniques. FIG. 3 (*a*) is an illustration of slices from three data volumes, such as, seismic 24, frequency colour-blend 26 and seismic attribute 28.

Further, recent advances in spectral decomposition show that, given appropriate data, very high-quality attributes and colour-blends can be generated. FIG. 3 (*b*) is an illustration of faults 30 and horizon layering 32 highlighted by a frequency colour-blend.

However, even with the interpretation tools available today, there are many cases where the analysis produces unclear or even erroneous results. In fact, one of the enduring problems of traditional seismic attribute analysis is noise (e.g. from poor signal quality) that remains in the computed attributes. As all edges are identified, noise often results in little or no separation between geological features and processing artefacts.

(ii) Artificial Neural Networks (ANN)

Presently, efforts are made to find technologies or new methods that are capable of "seeing" past any false signals. Recent developments suggest that Artificial Intelligence (AI) may be utilised to facilitate and improve the seismic interpretation process. Deep Learning (DL) in particular is believed to have great potential when closely aligned with the seismic interpretation processes.

Human reasoning is influenced by the experiences and lessons learned over time. As an individual's competence grows through experience and learning, their decision-making confidence increases. Deep Learning (DL), also known as deep structured or hierarchical learning, adopts the same theory, as its algorithms are inspired by biological learning processes and structures.

Artificial Neural Networks (ANN), such as Deep Learning (DL), "learn" by example and can solve problems with diverse, unstructured and inter-connected data. These qualities make Deep Learning (DL) a potentially productive technology for seismic interpretation. However, conventionally, a prohibitive amount of labelled data is required to sufficiently train a Deep Learning (DL) network for interpretation of seismic data. This constraint applies even to relatively small data sets.

One of the solutions to overcome the need for very large amounts of labelled interpreted data is to train Deep Learning (DL) models with synthetic data. For example, Huang et al., "*A scalable deep learning platform for identifying geologic features from seismic attributes*", (2017) proposed to train a 3D Convolutional Neural Network (CNN) on fault attributes generated from synthetic seismic cubes with simple fault configurations. Pochet et al., "*Seismic Fault Detection Using Convolutional Neural Networks trained on Synthetic Post-stacked Amplitude Maps*", (2018) trained a 2D CNN on patches of a synthetic data set with simple fault geometries, obtaining encouraging results when testing on actual sections offshore Netherlands.

However, when a Deep Learning (DL) network is evaluated on unfamiliar data with characteristics that differ from the training examples, the accuracy of the network tends to drop significantly. In order to maintain accuracy, it is necessary to calibrate a Deep Learning (DL) network to the nuances of the unseen seismic cube. This may be achieved by an interpreter manually adding information, such as missing faults, or amending existing predicted faults. However, because seismic interpretation is subjective, it is difficult to accurately label faults in 3D seismic data, as well as, very time consuming to ensure every fault is identified in a subset of the unseen data from which the ANN is updated.

For exemplification purposes, a detailed example of a suitable Deep Learning (DL) network capable of segmenting faults in seismic data, as well as, the process of training and calibrating (i.e. fine-tuning) such a Deep Learning (DL) network is provided in the following sections.

Semantic Deep Learning Networks:

For classification purposes, deciding if a region of interest (ROI) (such as a slice, slab or cube) contains a specific geological feature (such as a fault, horizon or geobody), requires making a prediction for a whole input. This type of coarse inference does not include the exact boundary of that feature, rather, that the feature exists somewhere within the input data.

Semantic segmentation is a natural step in the progression from coarse to fine inference, allowing different geological features to be fully segmented and not just identified. Semantic segmentation infers labels for every voxel (e.g. in 3D seismic data), so that each voxel is labelled with the class of its encompassing feature.

The general architecture for a semantic segmentation network requires discrimination at voxel level, together with a mechanism to project onto the voxel space the discriminative features learnt at different stages in the evolution of the network. A number of approaches support semantic segmentation including 'Region-Based Semantic Segmentation' and 'Weakly Supervised Semantic Segmentation'.

Fully Convolutional Networks (FCN):

A fully Convolutional Network is a deep learning architecture, such as illustrated in FIG. 4, that is capable of capturing semantic contextual information, as well as, recovering spatial information. FCNs are built from locally connected layers, such as, convolution, pooling and upsampling Given that all connections are local, an FCN can work on any data size without needing to fix the number of units. Segmentation networks are usually designed with three main components: a downsampling path (encoder), an upsampling path (decoder) and skip connections.

Downsampling paths allow a Deep Learning (DL) network to interpret the context (i.e. the "what") within the data. The upsampling path captures locational information (i.e. the "where"). During the downsampling process, fine-grained information is usually lost. Skip connections allow this information to be recovered by merging features from different resolution levels and facilitating combination of contextual and spatial information.

There are many variants of the FCN architecture, one example network may be a Visual Geometry Group (VGG) deep convolutional network illustrated in FIG. 5.

Within a VGG network, the primary purpose of using an encoder/decoder architecture is to force the network to encode the information into a useful feature representation, which is then analysed to generate the output. It also has a significant impact on reducing computational requirements, as the data is quickly compressed.

The individual components of a VGG network are as follows:

Encoder: The encoder consists of several encoding blocks. Each block employs two convolutions followed by a process which downsamples the size of the feature maps by a factor of two. This process is contained within a network layer called 'max pooling'. The width of each block is increased according to its depth, with the deeper layers having more channels. VGG compresses the image (or volume) of size one in every dimension, with many channels. This forces the network to 'encode' the information into the form of features.

Decoder:

The decoder is of similar design to the encoder, with the major difference being its input. The input not only receives the output of the last layer, but also the output of the encoder layer of the same size. This skip connection is employed with the purpose of improving the upsampling process, as the shallow layers contain fine-grained information. The input is first "fed" to a concatenation layer (see next paragraph), followed by a '1×1' convolution which combines the feature maps. An upsampling layer follows, which increases the size of the maps by a factor of two with a transpose convolution layer of a kernel size of '5×5' and a stride of two. Finally, a '1×1' convolution with twice as many channels as the previous layers of the decoder refines the upsampled maps. The width of the decoder is decreasing along with the network depth.

Concatenation Layer:

This layer receives two inputs and concatenates the inputs in the channel's dimension. This allows values from both (or either) input to be used when applying the next convolutional layer.

Normalisation:

In order to train a Deep Learning (DL) network, the training data is split into small (mini) batches that are used to calculate the network error and update its internal coefficients. The size of the batch is essentially a hyperparameter of gradient descent that controls the number of training samples to work through, before the model's internal parameters are updated. The other hyperparameter that affects the gradient descent calculation is the number of epochs. The number of complete passes through the training data set is controlled by the number of epochs. To reduce the number of training epochs required, the learning process is stabilized by applying normalization to the inputs of a layer. Different normalization processes could be used. In the disclosed example a BatchNorm or GroupNorm is selected based on the batch size that can be trained on a single GPU (Graphics Processing Unit).

Activation Function:

A non-linear transformation is applied to the input signal of the network layer making it capable of learning and performing more complex tasks. Different activation functions could be used. In the disclosed example a 'rectified linear unit' (i.e. a ReLu) is used as the activation function for every convolutional layer except the last one, which uses a Sigmoid to convert the activations into probabilities.

Feature Extraction:

VGG does not require a feature extraction block, often comprising only an encoder and a decoder. If "feature extraction" was used, it would comprise a series of computational layers (convolutional or fully-connected) to further process the encoded features, but without further spatial compression. This approach could be used for problems which are both complex and also interpretable at a relatively local level.

Feature Fusion Layer:

This layer receives two inputs of identical spatial dimensions but can have differing channel dimensions. The layer concatenates the inputs in the channels dimension. This allows values from both (or either) input to be used when applying the next convolutional layer. This is followed by a convolutional layer (usually '1×1') to select and combine the features from the two inputs. This is not the computationally most efficient method of combining several input-layers, but allows greater computational power.

Freezing Layers:

When fine-tuning a Deep Learning (DL) network, only certain layers, deemed 'choke point' layers, are left "unfrozen". These are layers where a large amount of processing is forced to traverse to pass their results to the output. This network has a greatly limited processing power, unless it uses the previously trained (and frozen) feature maps, resulting in a network which is limited in its ability to learn, but by using previously trained layers, can still perform a large amount of computational complexity.

Training

Semantic Deep Learning Networks typically require large amounts of data for training as network models can have many layers, each of which can contain thousands of internal parameters requiring tuning by a learning algorithm. The initial state of a Deep Learning (DL) model is "poor" with parameters often set to random values. A gradient based optimization (learning) algorithm is used to converge the network to an optimal solution. Due to local minima, this may not be the global optimum.

However, if the Deep Learning (DL) model starts off close to the required solution, then less data is required for training. To that end, the concept of transfer learning can be used, where Deep Learning (DL) models are pre-trained on other data sets that are conceptually similar to the current data set. Subsequently, instead of initializing the layer weights randomly (required for training a model from scratch), learned weights (from the pre-trained model) for each layer can be further trained.

A pre-trained network can be fine-tuned on new data by continuing the gradient based optimization process, either fine- tuning (adjusting the parameters) of all the network layers or by fixing ("freezing") certain layers and fine-tuning the remaining layers.

The disclosed example uses programmatically generated synthetic variable density data to pre-train a deep learning model. The synthetic data can be generated using different transformation configurations, such as, but not limited to, folding or sheering, together with varying levels of noise and geological features, such as, but not limited to, faults, horizons and geobodies.

In order to minimise the amount of training data required, an augmentation process may be used, resulting in each training example being uniquely augmented (or not) prior to training. Different augmentation transforms may be applied to the training data, such as, but not limited to, flip in 'x' or 'y' axis, rotation. Augmentation is only applied to a proportion of the time, when each training example is used and is randomised every time it is used.

Fine-tuning

Fine-tuning is a process to calibrate or specialise a Deep Learning (DL) network for a data set or type of data set. The result of the fine-tuning process is a network which should perform better than the input network on data which is similar to the fine-tuning training set (which is vastly smaller than the original network training data i.e. tens of examples, instead of many thousands).

For fine-tuning to be effective, accurate labelling is required. Imprecise or inconsistent labelling produces adversarial gradients in the training space, forcing the network to try and incorporate the incorrect results into the produced outcomes.

This problem is illustrated in FIG. 6, where an angled fault 34 appears wider in one axis (see FIG. 6 (*a*)). The fault would traditionally be picked in the other axis, however, when training a Deep Learning (DL) network, an accurate 3D representation (i.e. correct in both axes) is required. In this example, it is likely that this fault would not be correctly represented in a 3D volume. FIG. 6 (*b*) shows the fault(s) 34 in the 'raw' seismic cube, and FIG. 6 (*c*) shows the fault 34 to be smooth and planar.

This is also a problem when picking purely in 2D seismic data, as the fault could be picked accurately in one direction, but may be incorrectly picked in the other direction, therefore, resulting in inconsistent training in at least one axis.

Accordingly, it is an object of the present invention to provide an improved system and method for interpreting geophysical data addressing, in particular, the problems associated with fine-tuning, training, as well as, accurate labelling.

SUMMARY OF THE INVENTION

Preferred embodiment(s) of the invention seek to overcome one or more of the disadvantages of the prior art.

According to a first embodiment of the invention, there is provided a computer-implemented method for interpreting geophysical data utilising an Artificial Neural Network (ANN), performed by electronic operations executed by a computing device, comprising:

performing a training processing step on at least one training-data set, comprising the steps of:

(a) generating a first label-data by segmenting said at least one training-data set into at least a first region, representing a known first region having at least one identified geological feature, and/or a second region, representing a known second region having at least one unidentified geological feature, and a third region, representing an unknown region;

(b) generating a first ANN model output for a dynamically adaptable Region of Interest (ROI) of said first label-data, said dynamically adaptable ROI including said first and/or second region;

(c) generating an updated label-data by selecting at least a first portion of any one of said first, second and third region, and assigning and appending at least said first portion to any one of said first, second and third region;

(d) generating an updated ANN model output for an updated dynamically adaptable ROI of said updated label-data;

(e) repeating steps (c) and (d) until a predetermined condition is met, providing a final ANN model output;

applying said final ANN model output to a target-data set utilising said ANN, generating a desired output data.

This provides the advantage of allowing a seismic interpreter to progressively improve, for example, a Deep Learning (DL) network depicting geological features in a seismic data set. In particular, the system and method of the present invention allows for minimising the amount of labelled interpreted data that is required to train and fine-tune a Deep Learning (DL) network for interpretation of any geophysical data (e.g. 2D/3D seismic data) and reduce the computer processing time considerably. This "partial labelling" allows for data which cannot be correctly labelled to be excluded (or ignored) from the training process. Furthermore, the present invention allows the interpreter to selectively create or edit, for example, fault sticks in a manner that is consistent with and closely aligned to the interpreter's current interpretation workflow, as it removes the necessity to accurately label every fault occurrence in a training set. In addition, the system and method of the present invention removes the constraint of having to precisely label, for example, 3D faults on a 2D plane (i.e. slice), as well as, providing an automatic method for predicting fault locations on any plane (i.e. slice) the interpreter wishes to review prior to processing the entire 3D seismic data cube.

Advantageously, step (a) may include sub-step (a-i), generating at least one dynamic score for each one of said first label-data, each one corresponding to a distance value from any one of said at least one identified geological feature. Even more advantageously, step (b) may include generating a first ANN model output utilising corresponding said at least one dynamic score of said first label-data. Preferably, step (c) may include sub-step (c-i), generating at least one updated dynamic score for each one of said updated label-data, said at least one updated dynamic score may be optimised with respect to said updated label-data. Even more preferably, step (d) may include generating an updated ANN model output utilising said at least one updated dynamic score of corresponding said updated label-data.

Advantageously, said ANN may be adapted to ignore said third region when generating any one of said first-, updated- and final ANN model output.

Alternatively, said ANN may be adapted to utilise label-data from said third region when generating any one of said first-, updated and final ANN model output. In particular, label-data of 'Known-Not-Features' may be "fed back" into the system to "teach" the ANN to recognise undesired features.

Advantageously, said geophysical data may comprise seismic data.

Advantageously, said at least one training-data set may comprise any one or any combination of synthetic and real data.

Advantageously, said predetermined condition may be any one of a user input, a predetermined number of reiterations of steps (c) and (d), and a predetermined threshold parameter of said ANN. Preferably, said predetermined threshold parameter of said ANN may be a quality parameter of said updated ANN model output.

Advantageously, said desired output data may be configured to provide a visual representation of said at least one identified geological feature identified in said target-data set.

Advantageously, ANN may be a Convolutional Neural Network (CNN).

Advantageously, said at least one identified geological feature and said at least one unidentified geological feature may comprise any one of at least one fault, horizon and geobody.

According to a second embodiment of the invention, there is provided a system for interpreting geophysical data utilising an Artificial Neural Network (ANN), comprising:

a computer processor, and memory storing instructions executed by said computer processor, wherein said memory storing instructions comprise functionality to perform operations according to the method of the first embodiment;

a display device for rendering an output data to provide a visual representation of at least one identified geological feature identified in a target-data set.

According to a third embodiment of the invention, there is provided a non-transitory machine readable medium, including instruction, which when executed by a machine having at least one computer processor, causes the machine to perform operations according to the method of the first embodiment.

BRIEF DESCRIPTION OF THE DRAWINGS

Preferred embodiment(s) of the present invention will now be described, by way of example only and not in any limitative sense, with reference to the accompanying drawings, in which.

DETAILED DESCRIPTION OF THE PREFERRED EMBODIMENT(S)

The exemplary embodiment(s) of this invention will be described in relation to interpretation of 3D seismic data. However, it is understood that, in general, the system and method of this invention are equally applicable to any other type of data suitable to extract higher level features utilising ANNs, such as, CNNs.

For purpose of explanation, it should be appreciated that the terms 'determine', 'calculate' and 'compute', as well as, any variations thereof, as used herein are used interchangeably and include any type of methodology, process, mathematical operation or technique, including those performed by a machine or computer processor. The terms 'generating' and 'adapting' are also used interchangeably describing any type of computer processing/modelling techniques for visual representations of a subterranean environment from geophysical survey data, such as, for example, seismic data.

The invention uses a novel 'partial labelling' process that allows the use of small labelled areas or volumes to train ANN networks with much larger outputs (areas or volumes). In this process, a 3D data network can be trained by using 2D areas around geological features, for example, areas encompassing faults, horizons or geobodies. Moreover, a 2D data network can be trained with smaller areas of labels. In the absence of this process, entire data chunks (e.g. slices, slabs, cubes) would require accurate labelling over the full volume or slice, therefore, vastly limiting the ability of the interpreter to generate training data for the initial ANN network training and/or ANN network fine-tuning.

Figure 1:
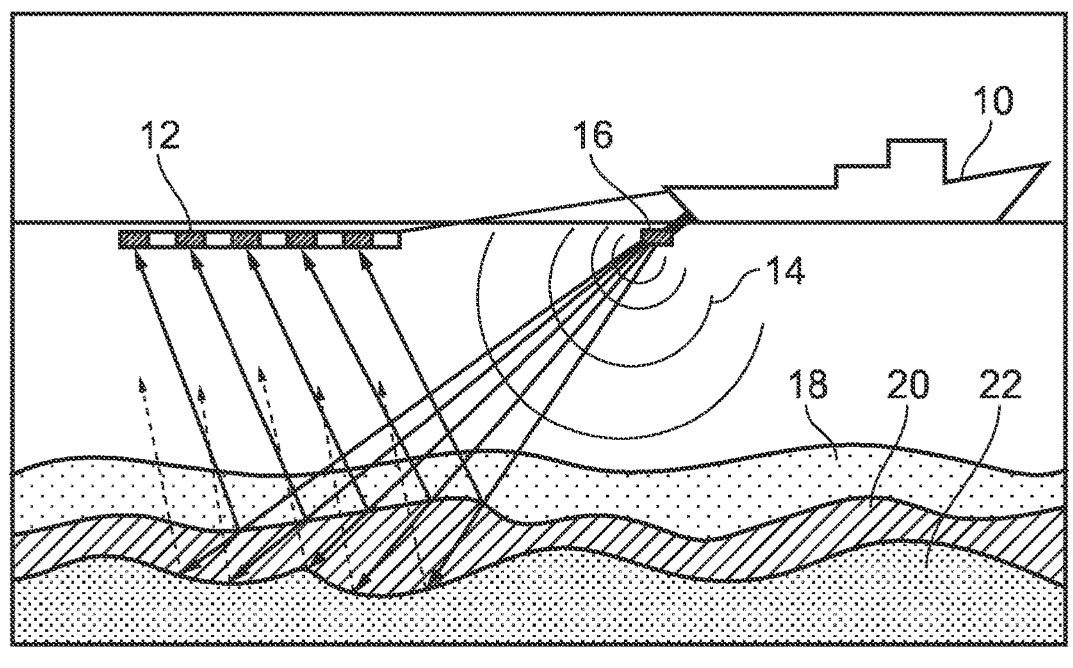
FIG. 1 shows a typical setup for an offshore seismic survey using an array of acoustic receivers (e.g. hydrophones) and sound waves generated, for example, by an air gun.
Figure 2:
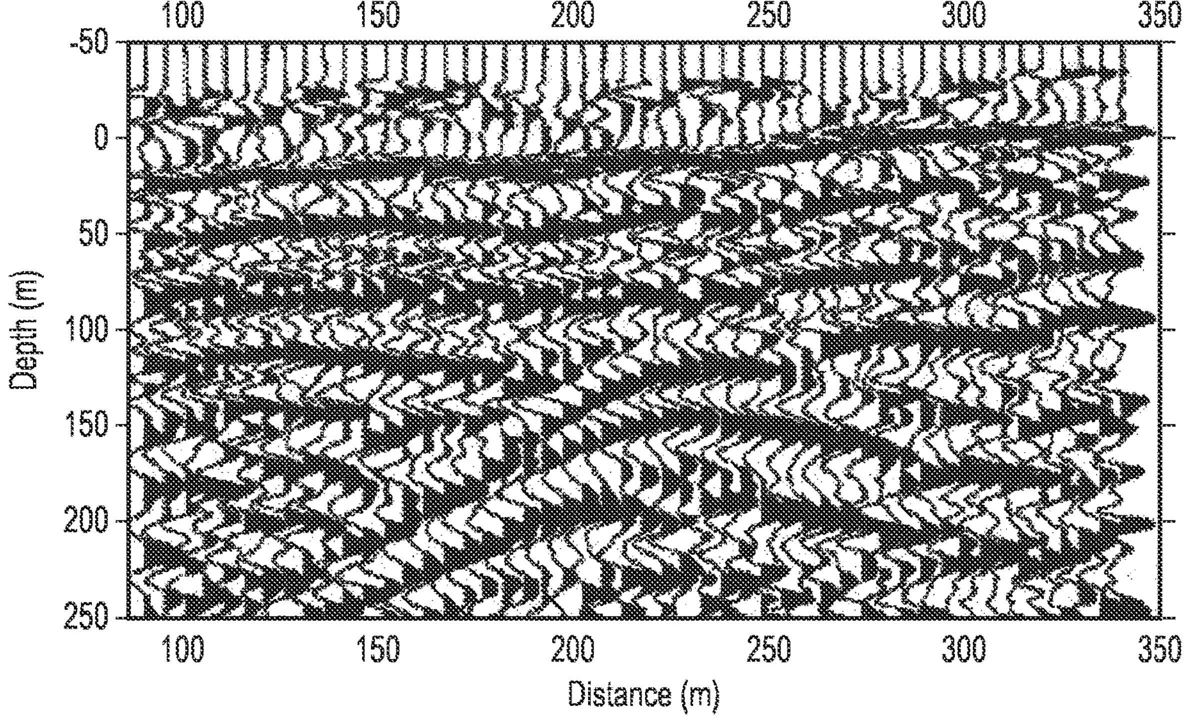
FIG. 2 shows a typical plot of migrated reflection traces recorded by the acoustic receivers after activation of the air gun.
Figure 3:
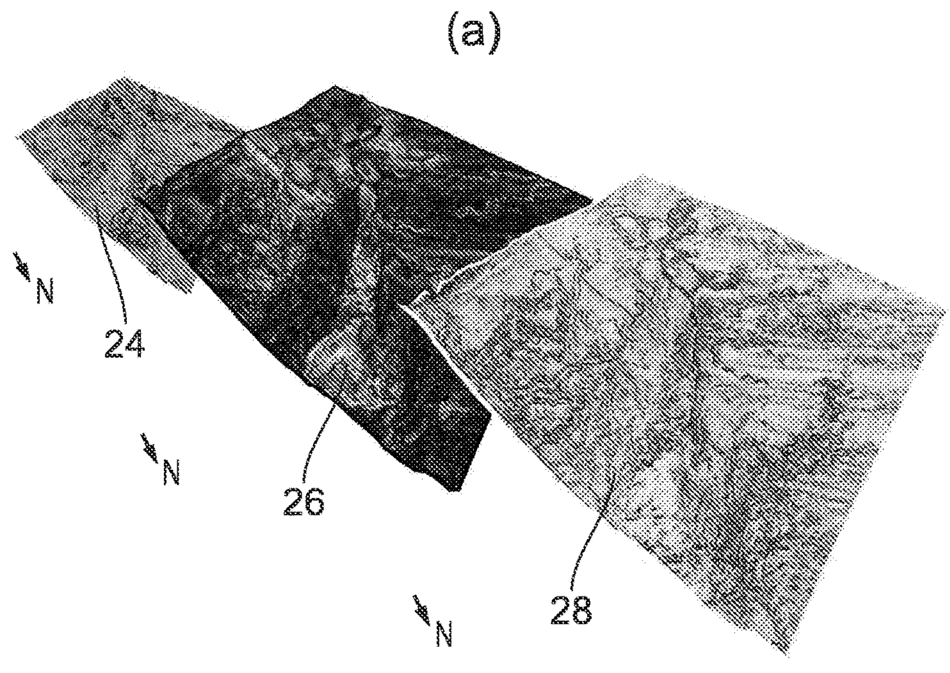
FIG. 3 shows (a) an example illustration of slices from three seismic data volumes (i) seismic, (ii) frequency colour-blend, (iii) seismic attribute, and (b) an example illustration of fault(s) and horizon layering depicted in a frequency colour-blend.
Figure 3:
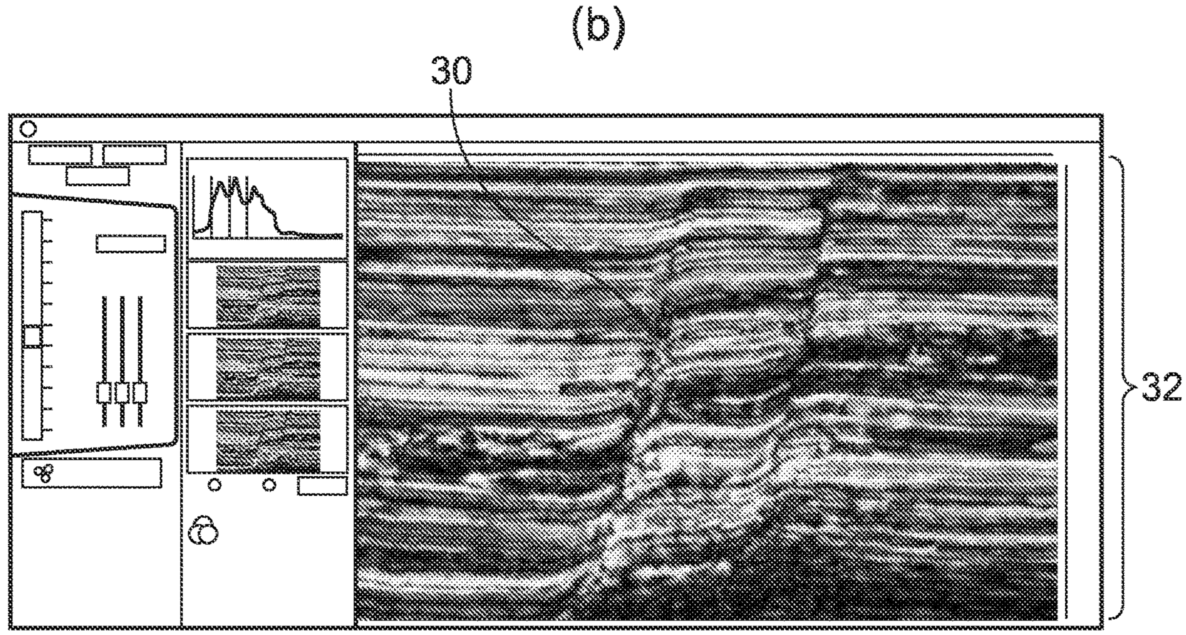
Figures 4, 5:
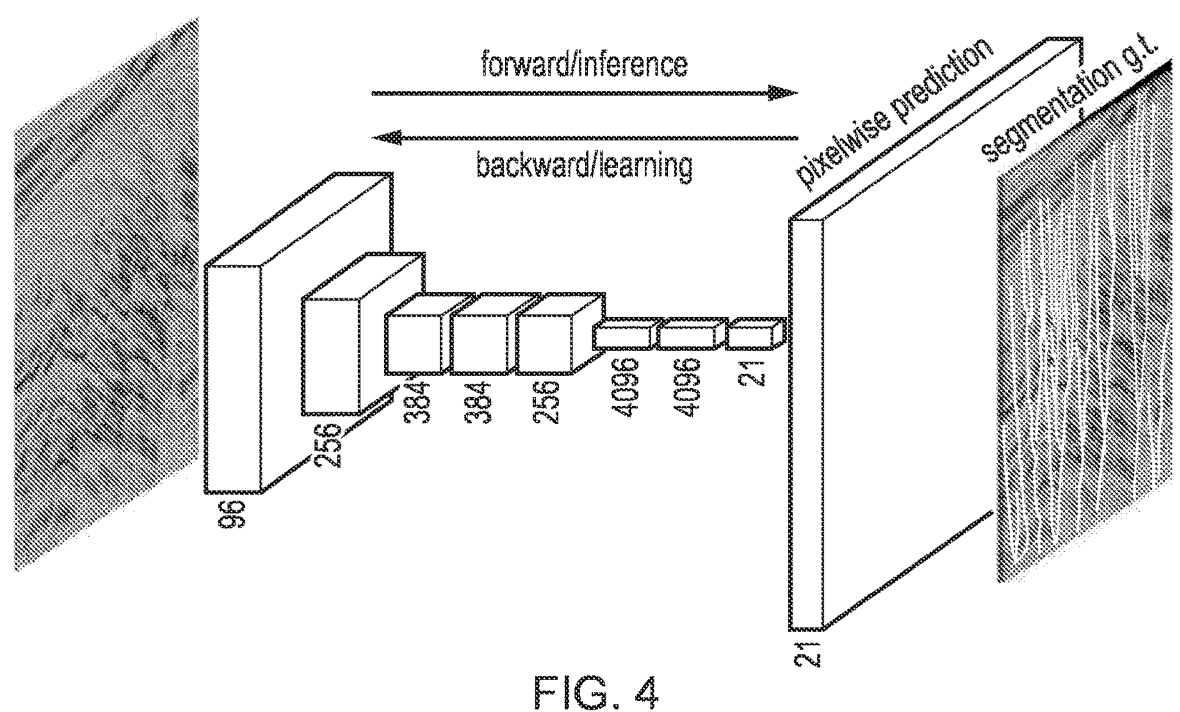
FIG. 4 shows an example illustration of a Fully Convolutional Network (FCN) utilised for segmentation.
FIG. 5 shows an example illustration of a Visual Geometry Group (VGG) Deep Learning (DL) network architecture.
Figure 6:
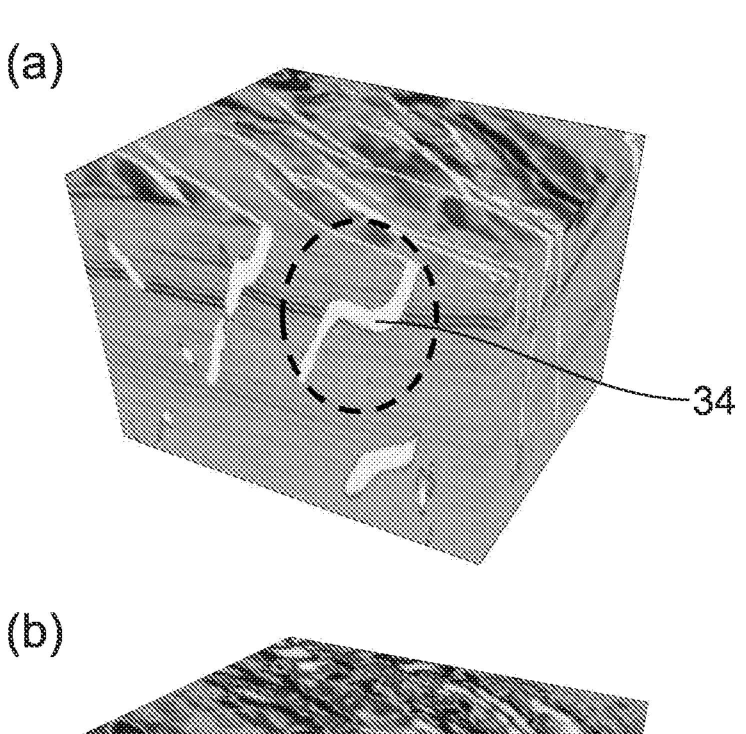
FIG. 6 shows an example illustration of incorrect fault representation in a seismic cube, where (a) illustrates an angled fault appearing wider in one of the cubes x, y, z-axes, (b) showing the raw seismic data cube and (c) showing that the fault is smooth and reasonably planar.
Figure 6:
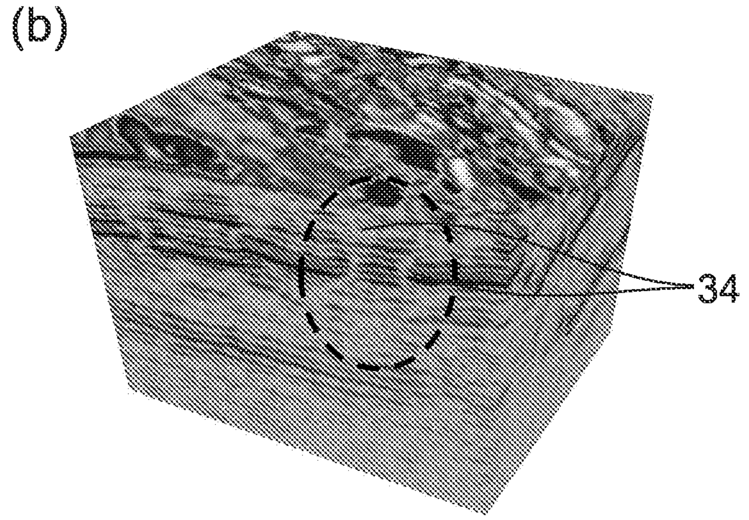
Figure 6:
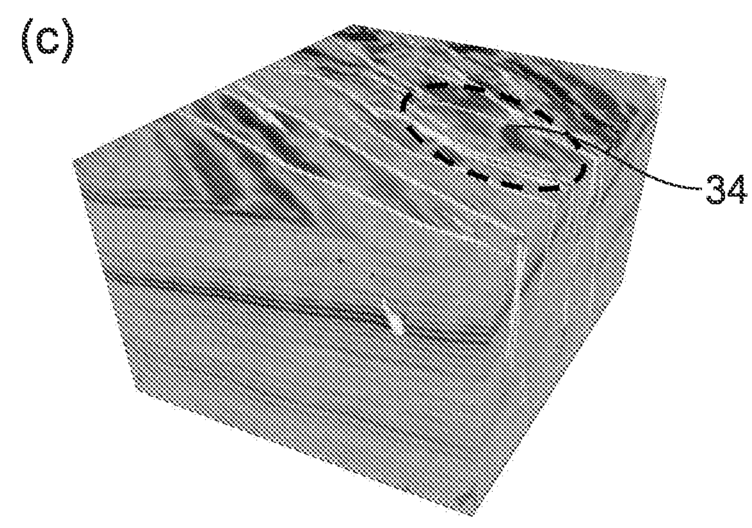
Figure 7:
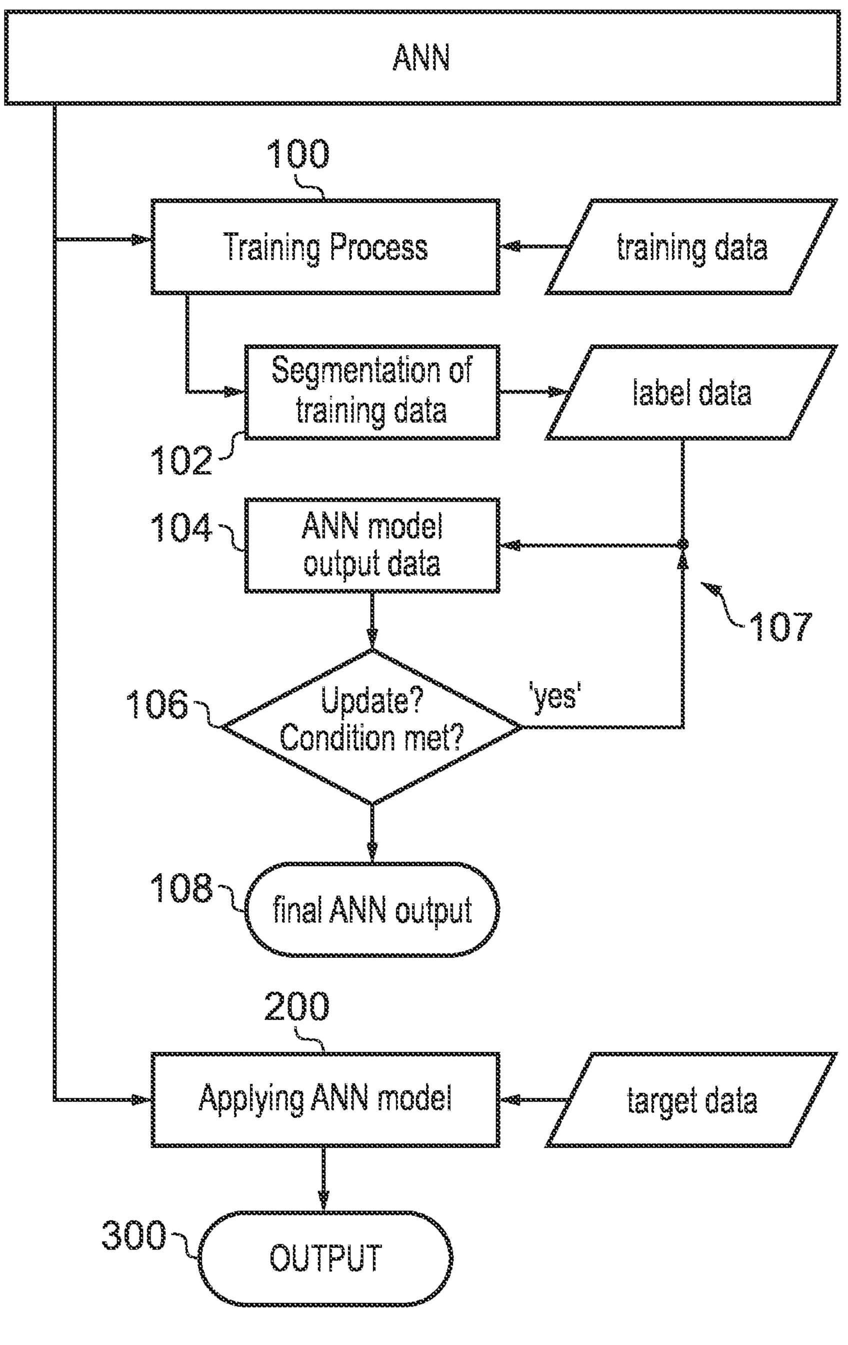
FIG. 7 shows a method flowchart in accordance with one or more embodiment(s) of the invention.

FIG. 7 shows an example method flowchart in accordance with an embodiment of the invention. For example, the method depicted in FIG. 7 may be practiced using a suitable computer system. In particular, the method comprises a training processing step 100 on a training data set, which may be real and/or synthetic data. When executing the training processing step 100 a first label data is generated by segmenting 102 the training data into different regions, e.g. a known first region 110 having at least one identified geological feature (e.g. a fault), a known second region 112 having at least one unidentified geological feature (this may be horizons, geobodies, but also unidentified faults), and an unknown third region 114 (see also FIG. 8). An ANN model output is then generated 104 from a Region of Interest (ROI) comprising known first and second regions 110, 112, but ignoring (i.e. excluding) the unknown region 114. The ROI is dynamically adaptable 106, either manually by the interpreter (i.e. editing the data), or via the ANN (e.g. in accordance with a predetermined condition), so as to generate an updated ANN model from the updated label data 107 until a predetermined condition is met (e.g. any one or any combination of a predetermined number of iterations, a interpreter input, and a threshold parameter of the ANN). The final ANN output 108 is then used as the ANN model applied 200 to the target data, so as to create, for example a visual representation of geological features identified in the target data.

In this particular example, the invention produces volumes with three types of labels: 'Known-Feature', Known- Not-Feature' and completely 'Unknown'. These are then grouped into the two categories: 'Unknown' and 'Known'.

As is understood by the skilled person in the art, the partial labelling process allows traditional techniques commonly used by interpreters (such as, but not limited to creating 2D faults sticks or polygons), and which are easy for the interpreter to work with, to produce 'ground truths' for an entire volume or a slice only using a small subset of the data. Thus, the partial labelling process supports a large portion of the 'ground truths' being 'Unknown'.

Figure 8:
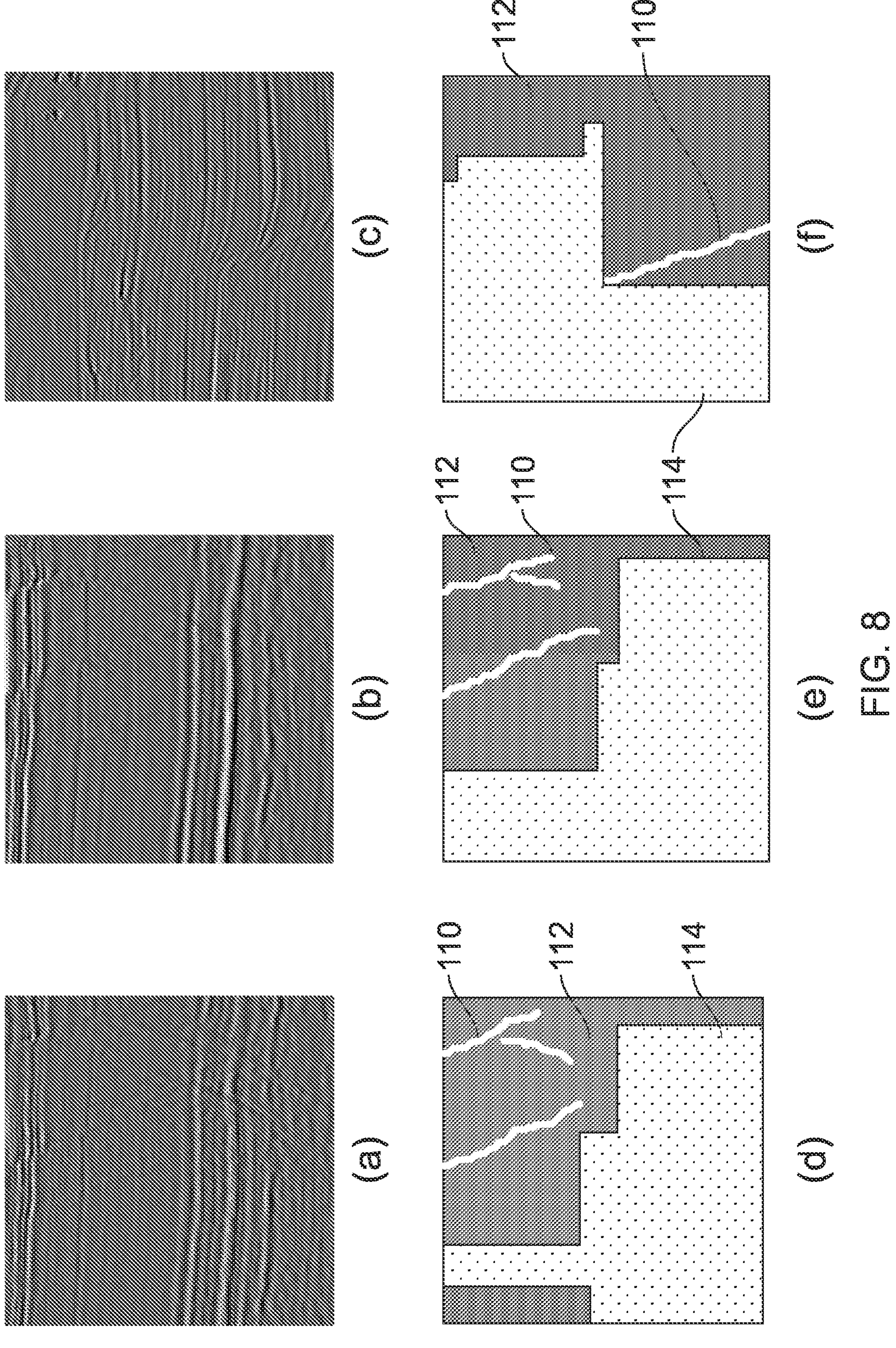
FIG. 8 shows an example illustration of three seismic slices (a), (b) and (c), and corresponding partially labelled images (d), (e) and (f), where 'black' represents regions that are 'unknown', 'grey' represents regions that are 'known, with unidentified geological features' and 'white' represents regions that are 'known, with identified geological features'.

For example, FIG. 8 shows three seismic slices (a), (b) and (c) in which faults are identified in only parts of the image (see (d), (e) and (f)). The partial labelling allows the interpreter to depict specific faults that may be characteristic of others in the data set and therefore alleviate the requirement to label every fault occurrence. Without using partial labelling, the accuracy of a Deep Learning (DL) network would be reduced, as any fault that was not labelled would become an example of a non-fault, therefore, mislabelling the training data creating ambiguities in what may be considered a specific feature.

Figure 9:
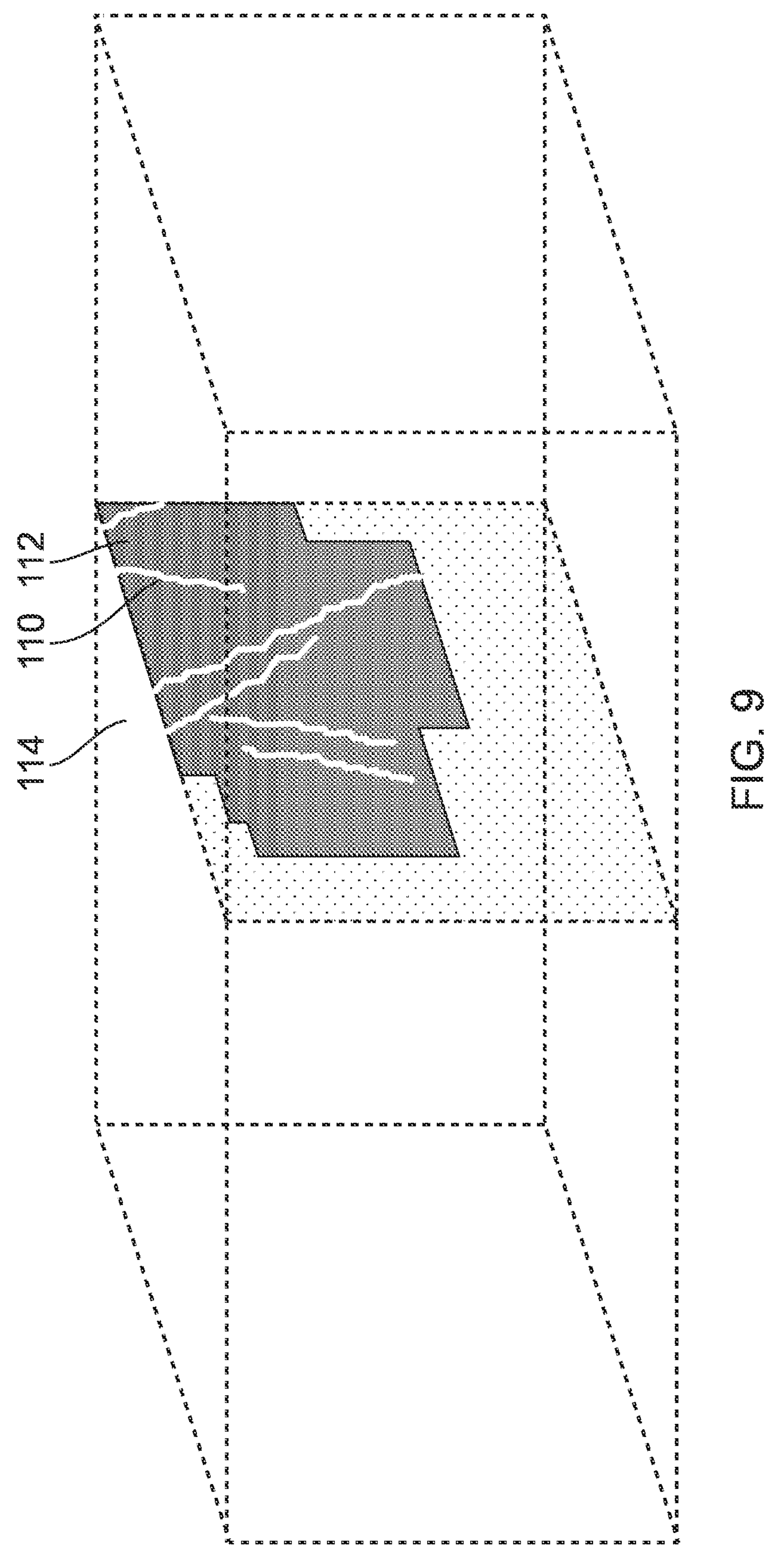
FIG. 9 shows an example illustration of partial labelling in a 3D slice used for training or fine-tuning the entire 3D volume.

When extending the partial labelling example to 3D data, a single slice (or a partially labelled slice) may be used to train or fine-tune the 3D data cube. This is illustrated in FIG. 9 showing an example of the training slice in a 3D volume. The dashed bounding boxes depict the location of the training slice and the encompassing volume. As shown in FIG. 8, 'black' (or in this particular Figure illustrated as dotted white shading or hatching) represents 'Unknown' regions 114, 'grey' represents 'Known-Not-Feature' regions 112, and 'white' represents 'Known Feature' regions 110.

Figure 10:
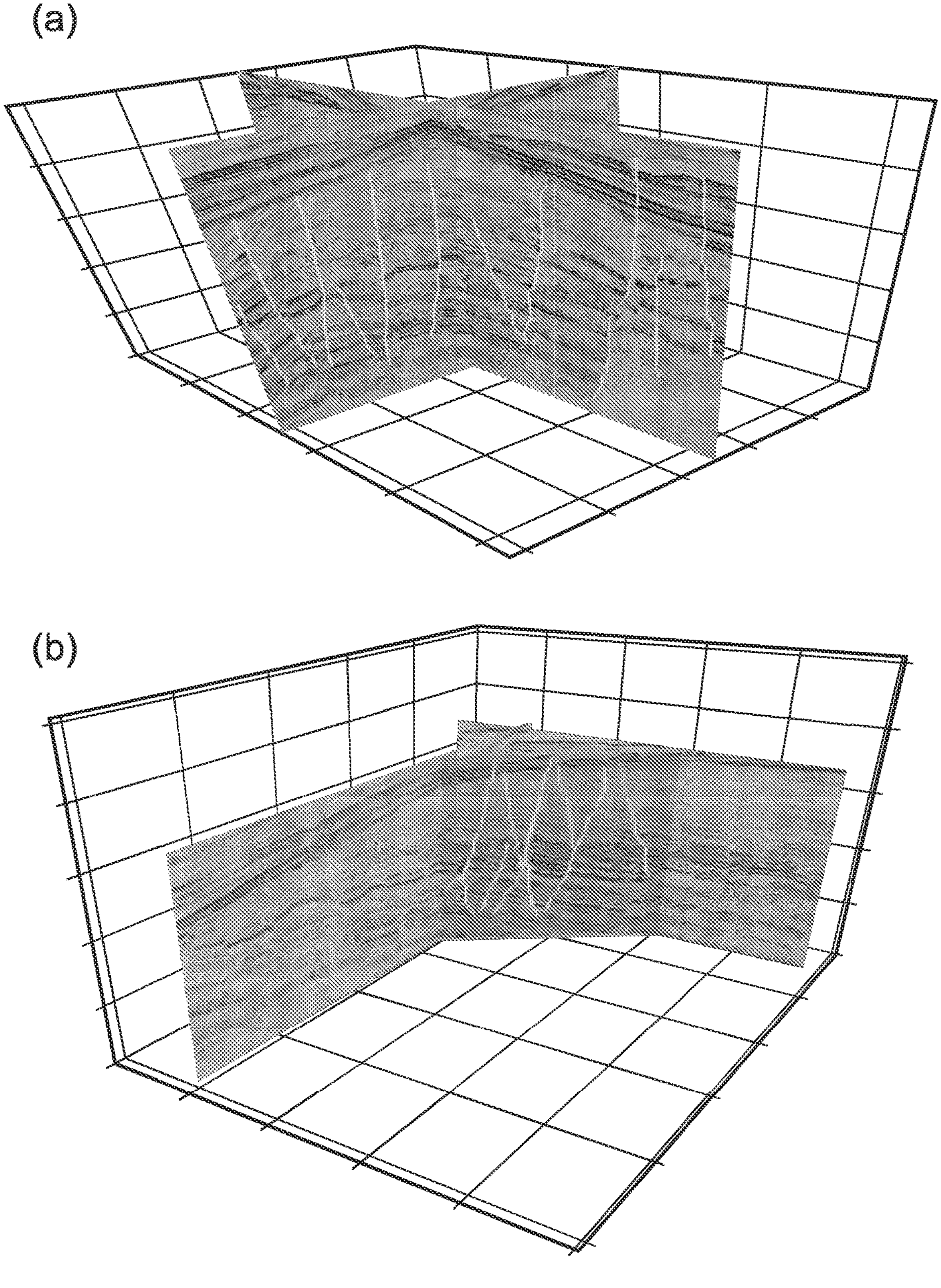
FIG. 10 shows an example illustration of a number of labelled representative faults identified (a) in an inline slice and a crossline slice and (b) on an arbitrary slice.

Within a 3D data cube, several partially labelled slices may be used to train or fine tune the ANN network. These partially labelled slices may be in any orientation (i.e. inline, crossline, time or arbitrary line). FIG. 10 illustrates an example, where a limited number of faults have been labelled on (a) two axes (inline and crossline) and (b) on an arbitrary slice. In particular, FIG. 10 (*a*) shows a number of labelled representative faults within inline- and crossline slices, wherein FIG. 10 (*b*) shows labelled faults on an arbitrary slice within the 3D cube. In the event that training data can be produced in 3D (such as surfaces), then partial labelling would also support partially labelled 3D chunks for training 3D data networks.

Further, when allowing an interpreter to improve the output of, for example, a Deep Learning (DL) network from one or more slices of labelled data, this can be further aided by using the output of another Deep Learning (DL) network, or a separable output from the same Deep Learning (DL) network so as to produce, for example, an initial fault label, which the interpreter may correct or adjust. In particular, that output may be generated by using the results of a 2D network run in any orientation of the 3D cube (i.e. inline-, crossline-, time- or arbitrary slice) as input in the form of labelled data to a 3D network. Additionally, the system and method of the present invention is capable of supporting amendments to the output of a 2D network undertaken by the interpreter prior to "feeding" the results into the 3D network.

For that reason, an optional extension to an ANN (e.g. an FCN) is proposed that is adapted to "learn" how to predict faults from differently orientated slabs of 3D data (e.g. inline, crossline, time).

Here, both 2D and 3D networks are able to recognise geological features (e.g.

faults, horizons and geobodies) in different orientations (such as, but not limited to, inline-, crossline-, time- and arbitrary slice(s)). The system and method of the present invention permits any FCN network to be extended by "learning" how to predict any geological feature from differently orientated slices or slabs of the 3D data.

Figure 11:
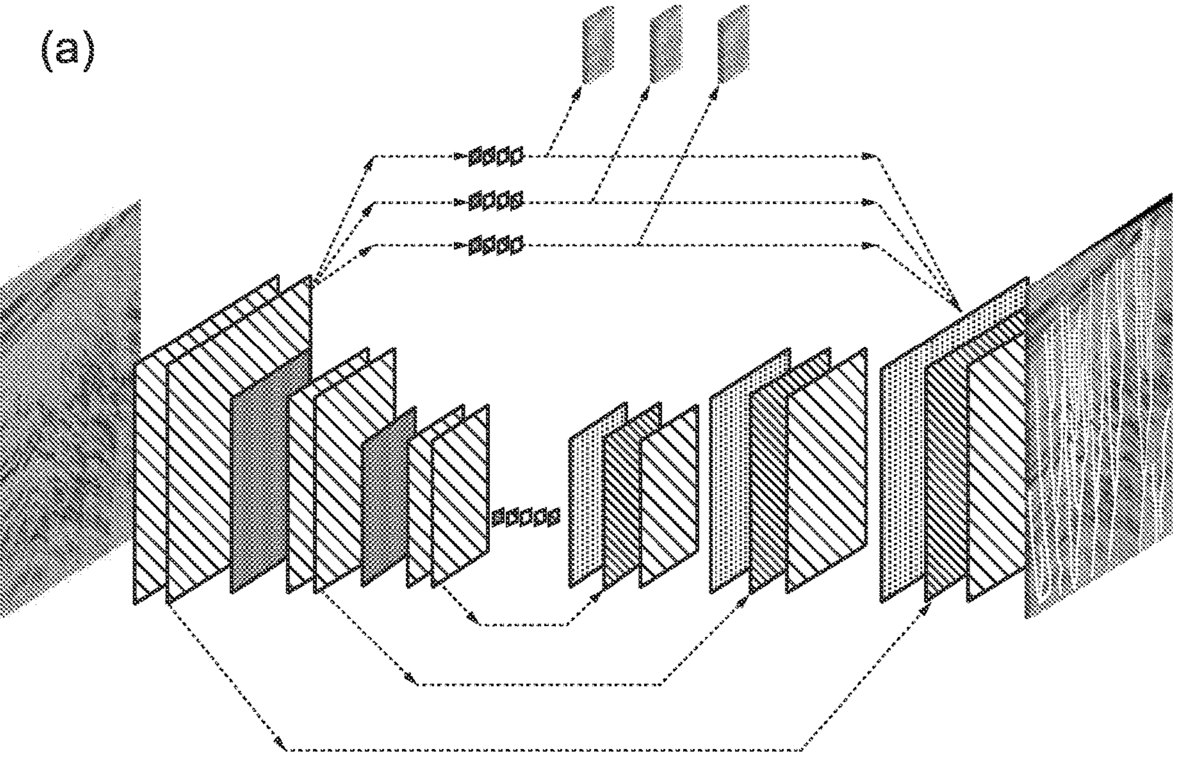
FIG. 11 shows example illustrations of a VGG network (a) using a plurality of parallel branches, each one for a different orientation, in line with the VGG network, (b) using a plurality of parallel branches, each one for a different orientation, replacing a predetermined section(s) of the VGG network, and (c) a VGG extension to generate separable outputs for inline data, crossline data and time data.
Figure 11:
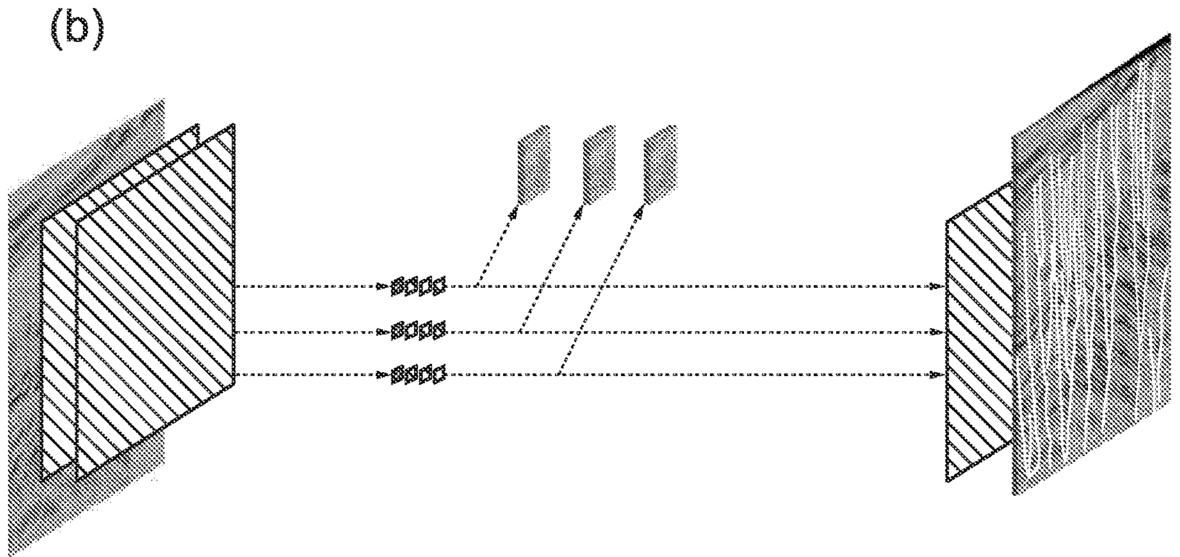
Figure 11:
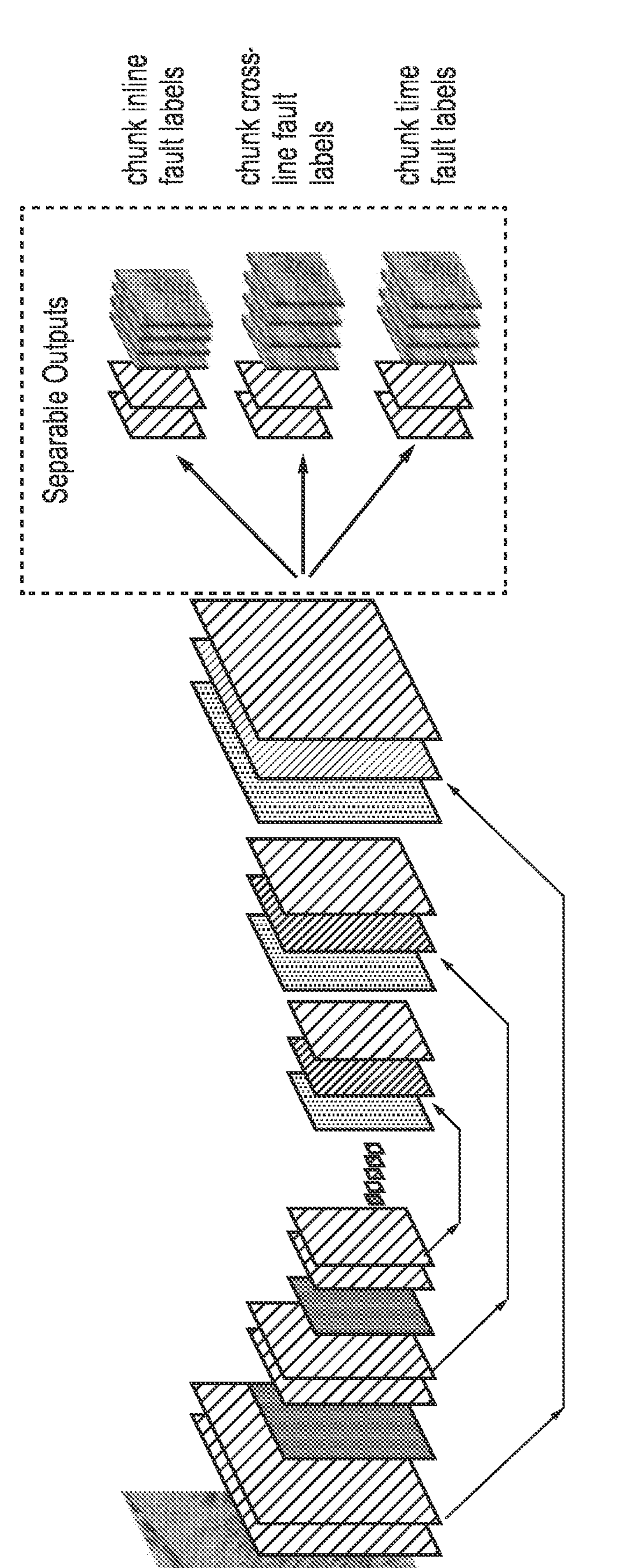

As illustrated in FIGS. 11 (*a*) and (*b*), this concept may be achieved by including parallel branches within a fully convolutional network (FCN), e.g. one branch for each desired orientation. The use of multiple branches provides the advantage that each branch can be used to focus on a different representation of a selected geological feature, therefore, capturing how that feature appears in these different orientations. The system and method of the present invention may also be applicable to geological features where only a specific representation can be labelled.

In a preferred embodiment of the present invention, the architecture of each parallel branch is the same. However, in other embodiments different architectures may be used for different branches, i.e. each one specialised for a specific representation.

Furthermore, each one of the branch is configured to be fine-tuned separately with labels that are suitable for a specific representation defined in the branch. For example, a fault may be separately labelled on any orientation that is represented by a branch (incline-, crossline-, time- or arbitrary slice).

There are several ways to "train" the parallel branches, such as, for example:

applying a loss metric (see below) to the branch itself;

"freezing" the weights on the branches that are not being trained.

Further, it is understood that the parallel branches can extend across any proportion of a fully convolutional network (FCN), as illustrated, for example, in FIG. 11 (*a*), and/or the parallel branches may replace sections of the FCN, see illustration in FIG. 11 (*b*) compared to FIG. 11 (*a*), wherein the output from the parallel branches may be merged (see FIGS. 11 (*a*) and (*b*)).

The example illustrated in FIG. 11(*a*) may be a VGG network that has been extended so as to comprise three additional branches, thus, enabling the FCN to "learn" how a 3D object is labelled in three different orientations (e.g. inline, crossline and time, respectively). More branches may be added for additional orientations. So, when a label with a specific orientation is presented to the FCN, the other branches are then used to achieve the requisite fine-tuning.

In an alternative example embodiment as illustrated in FIG. 11 (*c*), a VGG network has been extended to produce separable outputs (i.e. inline, crossline, and time). Here, a separable output from the same network is used to make an initial fault prediction from the differently orientated "chunks" of 3D data. The interpreter can then correct or adjust the initial fault prediction.

Figure 12:
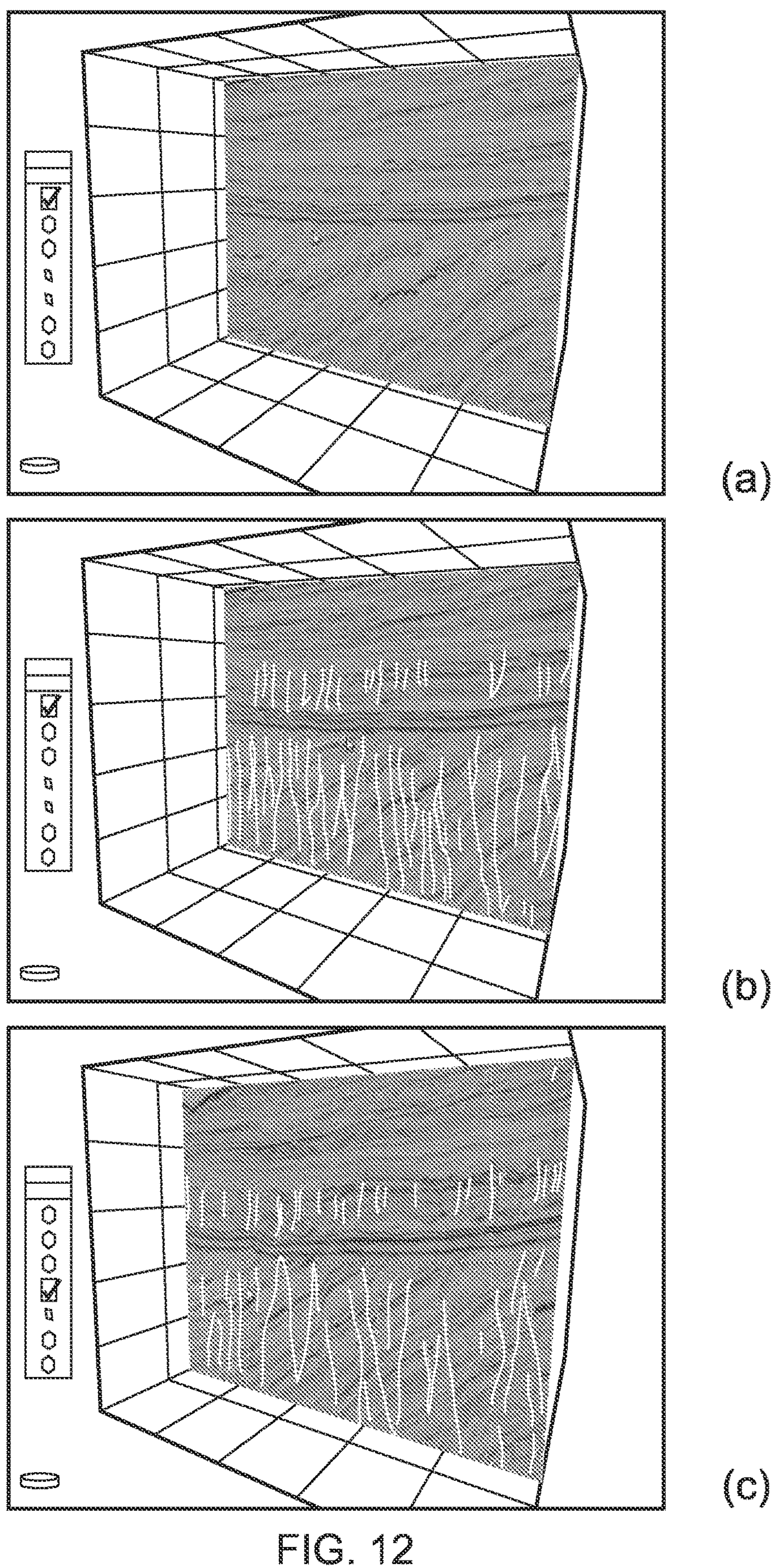
FIG. 12 shows an example illustration of a fault preview workflow (a), (b), (c), allowing the interpreter to pan through a volume slice-by-slice automatically displaying the predicted location of faults.

By extending the output of the network to produce differently orientated outputs from the same underlying training data, an interpreter is able to pan through the data (e.g. slice by slice) using the best orientation to see the geology, such as faults or channels or other geological features, In the disclosed example, the appropriate separable VGG network output evaluates a data slab around each slice and automatically displays the predicted location of the faults (see FIG. 12 (*a*), (*b*), (*c*)).

Figure 13:
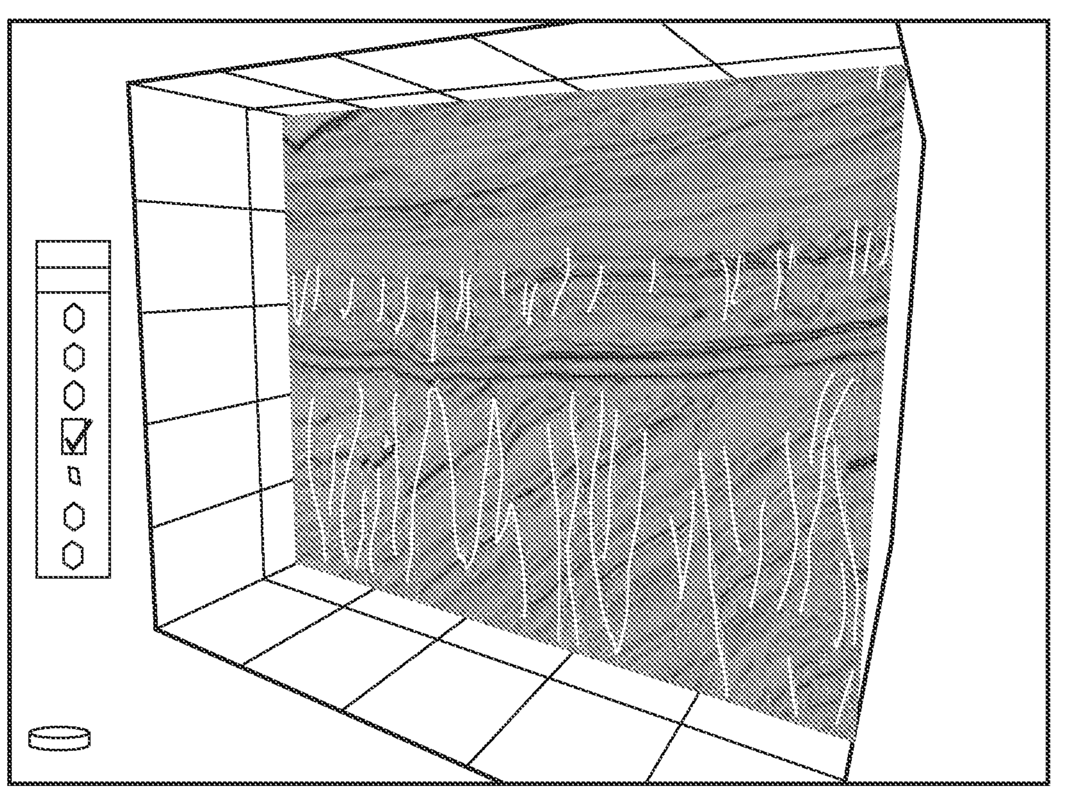
FIG. 13 shows an example illustration of automatically extracted fault sticks from the preview workflow shown in FIG. 12, allowing the interpreter to make further edits.
Figure 13:
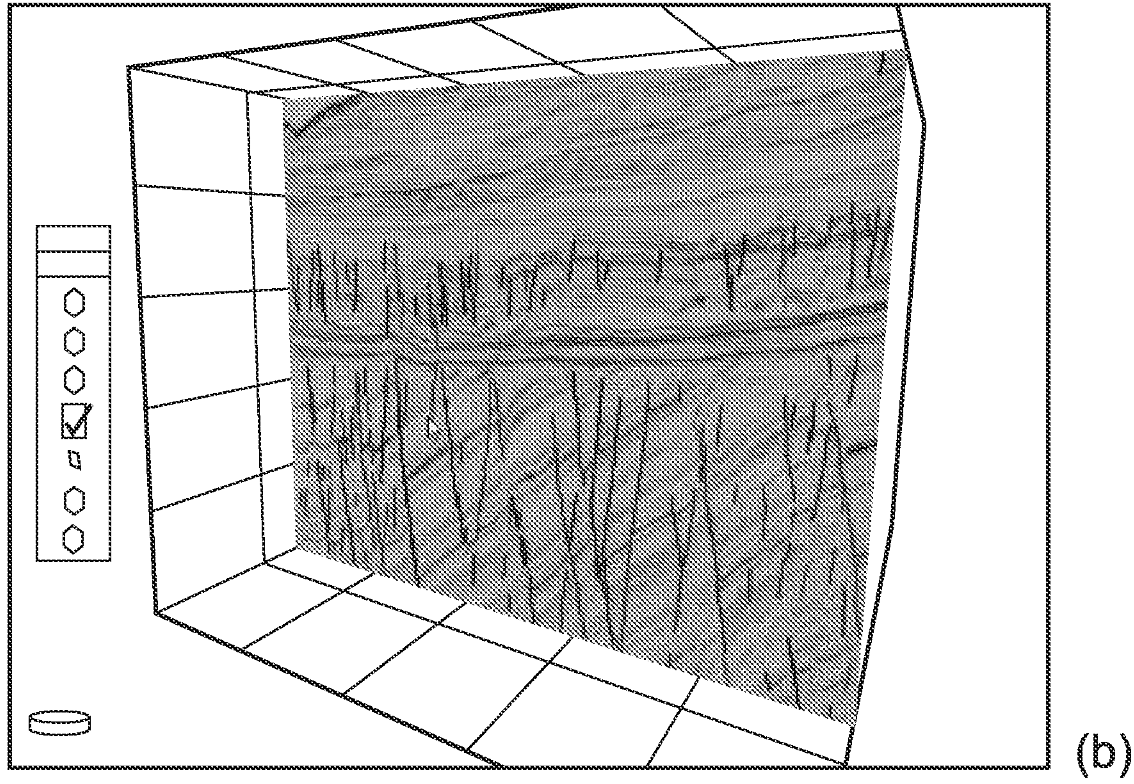

Here, the partial labelling process allows the interpreter to add edit fault sticks on a single slice within the slab of data prior to feeding back the interpretation amendments into the Deep Learning (DL) network. Fault sticks are then automatically generated from the Deep Learning (DL) predictions as shown in FIGS. 13 (*a*) and (*b*).

In addition, when generating labelled data volumes from the interpreter's new or edited fault sticks, the present invention generates a volume of voxels labelled as 'Unknown' so as to match the size of the seismic data cube or slab. The proposed method then converts (i.e. rasterises) all fault sticks into voxel space and labels each voxel that intersects a fault stick as 'Known Feature'. Voxels aligned with the fault representation in the immediate vicinity and which are 'Unknown' are labelled as 'Known-Not-Feature'. A filter is then applied to exclude any faults which are on an axis which is inappropriate for the Deep Learning (DL) network.

In addition, the system and method of the present invention is capable of supporting interpreters seeking to label areas that are 'Known-Not-Features'. The specific 'Known-Not-Feature' labels are used to further reinforce the ANN by "teaching" it how to recognise data that is not the desired feature. For instance, if a region has been incorrectly predicted as a fault, then the interpreter could relabel the candidate fault to be an example of a 'Known-Not-Feature' (i.e. not a fault).

For ANN networks with a separable output, different features may be relevant for different outputs, though, it is acceptable for one output to be comprised of entirely 'Unknown' voxels.

Furthermore, the method of the present invention may also accept voxel labelled volumes if the volume has a matching configuration to the seismic data. In the disclosed example, a labelled volume may be generated directly from identified seismic features.

Any 'Unknown' voxels close to a feature are marked as 'Known Not Feature' voxels to then form a plane for any 2D features and a volume for any 3D features. The extent of the bounding box is determined from the feature and is also an estimate of the feature accuracy.

Figure 14:
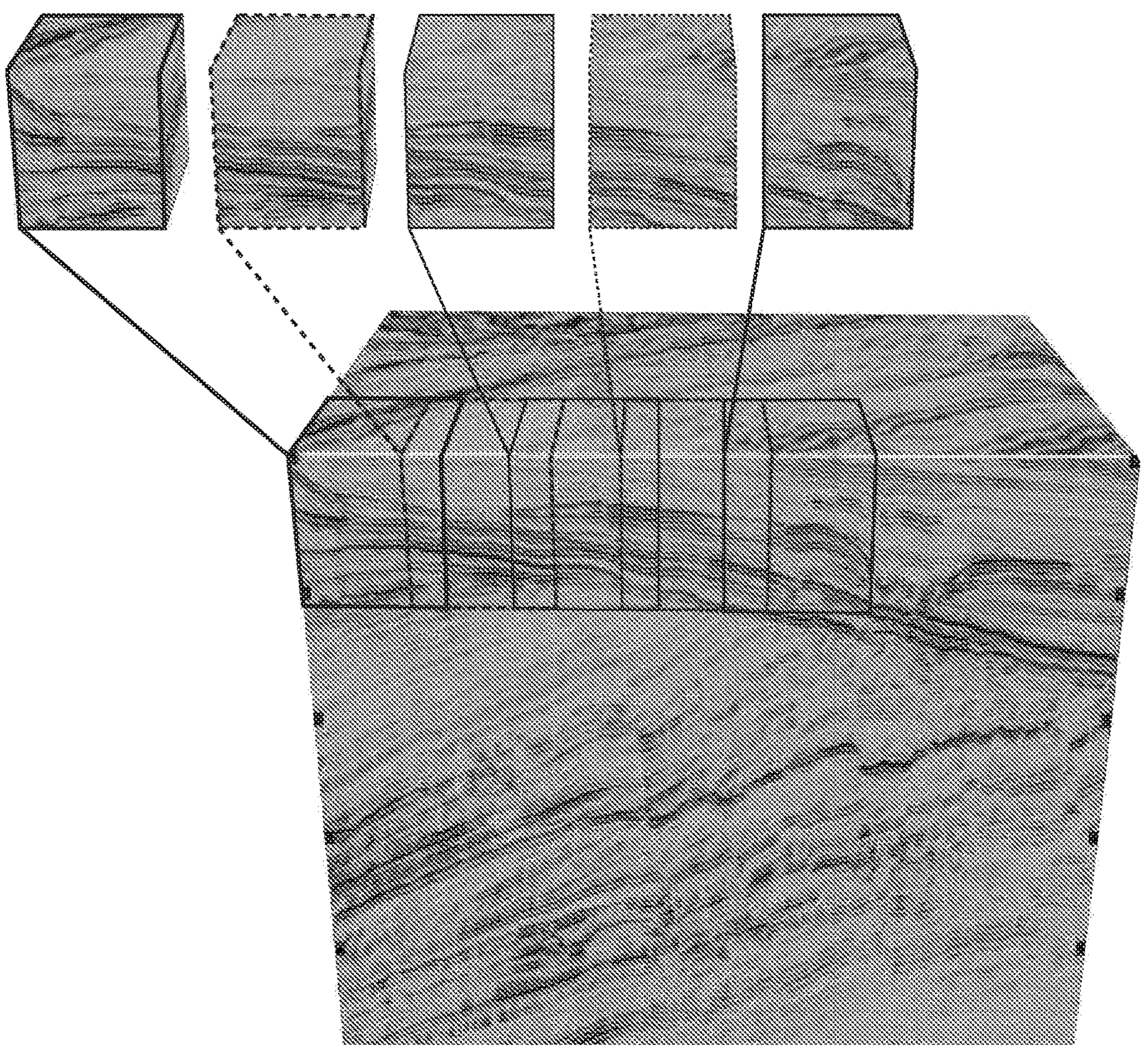
FIG. 14 shows an example illustration of "chunking", i.e. dividing a 3D seismic cube into smaller chunks.

The 'Known Feature' data (e.g. seismic) is further normalised so that the data has a standard deviation of '1' across the entire volume. In order to achieve this, the proposed method first adjusts the data so that its zero-crossing is at zero, then regions of the volume which are unlabelled are removed. After that, the standard deviation is calculated from the histogram of the volume to then scale the values to enforce the required standard deviation. Finally, the volume is divided into chunks by using the same method and pattern as for dividing or chunking the seismic data volume (see FIG. 14). This process ignores any training examples which do not have sufficient 'Known' voxels in the label(s).

So, when training with a labelled data volume, any 'Unknown' voxels are removed before calculating the gradient based optimization error. Failure to remove the 'Unknown' voxels would adversely impact the balance of the errors and losses counted, thus, reducing the quality of the outputted results.

In this particular example, the partial labelling process is described as an amendment to a VGG network. However, it is understood that the partial labelling process can support any FCN Deep Learning (DL) architecture and use multiple input and/or output channels to allow supplying multiple attributes and producing multiple results.

Also, the proposed method does not colourise the data. However, the system and method of the present invention could return multiple channels to represent a segmented classification, which is not the case in the described example.

In addition to the partial labelling, the system and method of the present invention utilises a novel loss metric, minimising the impact of any inaccuracies and imprecisions inherent to the interpretation of noisy data on the ANN network.

Loss Metric:

A loss metric is a measurement that uses the distance from any geological feature in order to assign a weight to an evaluation error. The approaches utilised here may include, but are not limited to, the use of distance gradients and/or any functional or geometric representation so as to map an evaluated feature onto a labelled geological feature, such as, for example, a fault.

Figure 15:
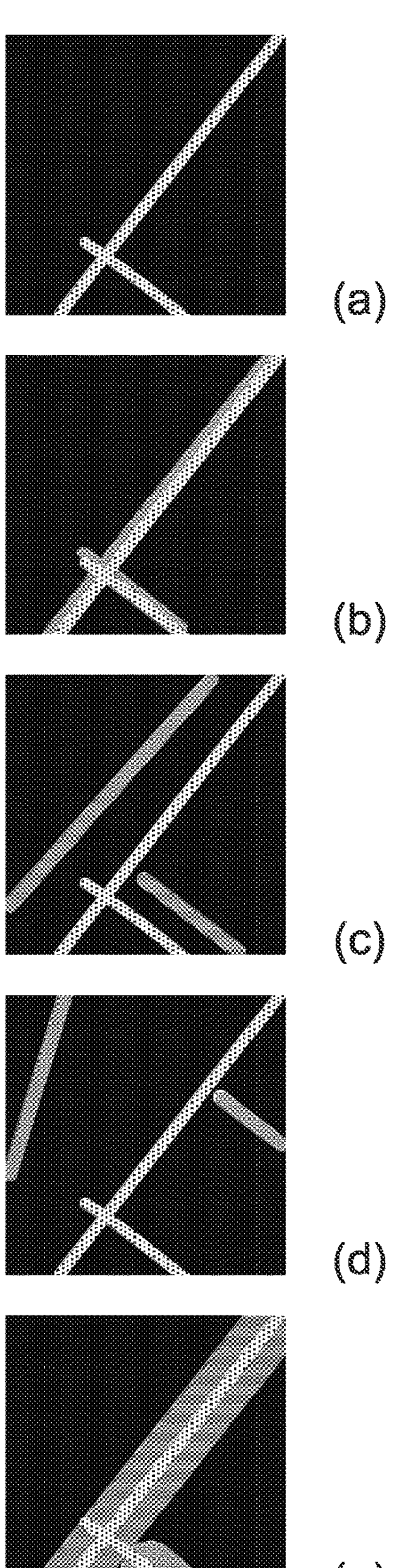
FIG. 15 shows an example illustration of a series of (known) binary loss responses, where an accuracy score is calculated between known fault(s) and predicted fault(s), (a) score 1—result is identified as entirely correct, (b) score 0—result is identified as almost entirely wrong, despite being caused by a small shift, (c) score 0—result is identified as entirely wrong, despite being caused by a medium shift, (d) score 0—result is identified as entirely wrong, error caused by a large shift, (e) score 0.5—true positive labels identified as correct, but false positive labels identified as entirely wrong.
Figure 16:
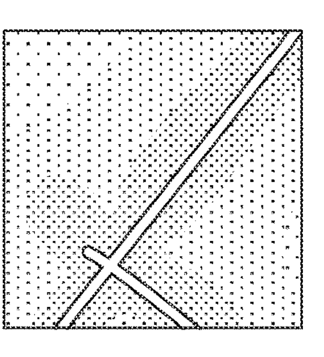
FIG. 16 shows an example illustration of a series of proposed distance loss responses, where a more accurate score is calculated between known fault(s) and predicted fault(s), (a) score 1—result is identified as entirely correct, (b) score 0.95—result is identified as almost entirely incorrect, but all with a small error, (c) score 0.8—result is identified as almost entirely incorrect, but with a moderate error, (d) score 0.2—result is identified as entirely wrong, and with a large error, (e) score 0.9—true positive label is identified as entirely correct, and false positive labels have a small error.
Figure 16:
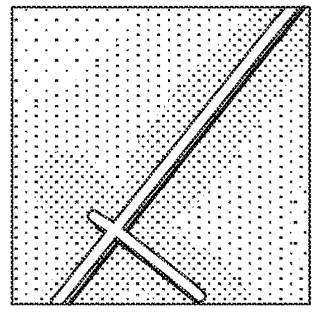
Figure 16:
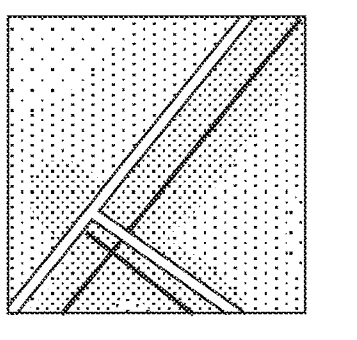
Figure 16:
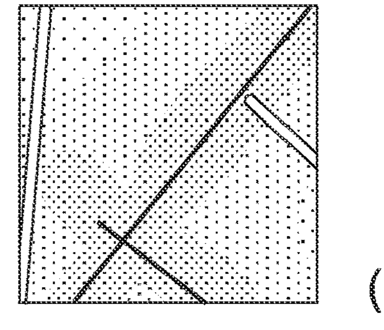
Figure 16:
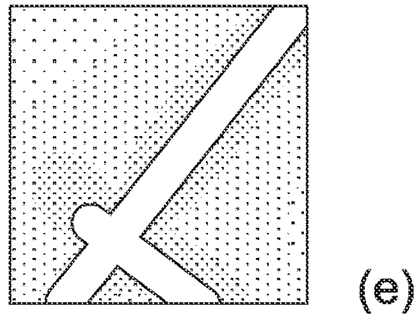

The system and method of the present invention may also comprise a novel Dynamic Distance Loss method allowing the ANN network to train effectively. The need for the additional Dynamic Distance Loss method is illustrated in FIGS. 15 (*a*) to (*e*). Here, a binary accuracy score is calculated between known faults and predicted faults. FIGS. 16 (*a*) to (*e*) illustrate how the proposed Dynamic Distance Loss method provides a more accurate response, resulting in smooth optimisation gradients, faster training times, improved final scores, as well as, a reduced impact from inaccuracies in the labelled training data.

Early in the Deep Learning (DL) process, the output of the ANN network will often produce very broad and wide features approximately in the correct locations. Consequently, this stage of training is not impacted by minor inaccuracies or imprecisions in the training data. Also, as training proceeds, the ANN network is forced to pick a clear boundary for any of the identified features, therefore, culminating in an accurate result with the best precision available from the training data.

In the absence of the proposed Dynamic Distance Loss method, a fault which has low precision in labelling, would likely be considered wrong for reasons, such as, (i) missing a label, or (ii) for incorrectly picking a fault. As such, the training would likely lead the Deep Learning (DL) network to not pick any feature(s) at all. This would further be compounded by imprecisions in many places, potentially resulting in a highly contradictory training set.

On the other hand, the system and method of the present invention covers any loss (or error function) which builds a relationship between distance and error score, as it is not particular to this equation. The Dynamic Distance Loss method described in the disclosed example supports a dynamic 'tolerance' adjustment, allowed by changing a single parameter (i.e. 'alpha') to adjust the shape of the error to the distance curve. Thus, allowing the relationship between distance and error to be controlled.

The Distance Loss may be calculated according to the following equation:

$$IncorrectVoxelLossError = \left(\text{scale} * \sqrt{classWeight * \frac{\text{distance}}{distanceMax}}\right)^{alpha} \quad \text{[Eq. 1]}$$

$$CorrectVoxelLossError = 0$$

In the equation Eq. 1, the following parameters are used:

Distance:

This is the straight-line distance (measured in voxels) to the nearest matching labelled feature class voxel.

DistanceMax:

This is the maximum distance value possible in a chunk. For example, in a 64×64×64 chunk, the distanceMax would be approximately '110' which is the diagonal distance across the chunk.

ClassWeight:

This is the ratio of the occurrences of the current class to the occurrences of all the other classes measured across the data set. In the disclosed example, this is the ratio between "Feature" and "Not Feature" which could be in the order of one to thirty, where there are thirty "Not Feature" voxels for every one "Feature" voxel.

Scale:

This is a parameter to convert the resulting values to the correct range for the optimiser. In the present example, the scale may be one thousand ('1000'), which scales the values to 0 to 0.01.

Alpha:

This is a parameter which controls the relationship between distance and error:

>1 makes the scores more lax.

1 has no impact on the score.

0 is infinitely harsh.

In the present example, 'alpha' may start at '1' and adjust down to '0.1'.

In particular, the proposed Dynamic Distance Loss method uses the fact that during initial fine-tuning, the ANN network has not yet learnt any of the training set. A Distance Loss is then calculated with the dynamic parameter 'alpha'set to a 'lax' value. This reduces the penalty for being close to a feature (e.g. fault) in either width or position, without changing the error for being grossly incorrect. This allows the ANN network to produce imprecise, but accurate labels within the general location of the geological features of interest, therefore, making the training gradients smoother and less impacted by inaccuracies in the training data. As the ANN network score improves, the Dynamic Distance Loss method dynamically adjusts the 'lax' parameter to make it less tolerant of imprecision, increasing the penalty score for close- but imprecise faults. In case there are any inconsistencies or inaccuracies in the training data, the ANN network will have already learnt the general shape of the labels and fitted as best as it is able. Also, in case the labels are accurate and precise, the ANN network will still be able to benefit from the enforced accuracy during the later stages of training (the score for correct results is always zero).

Figure 17:
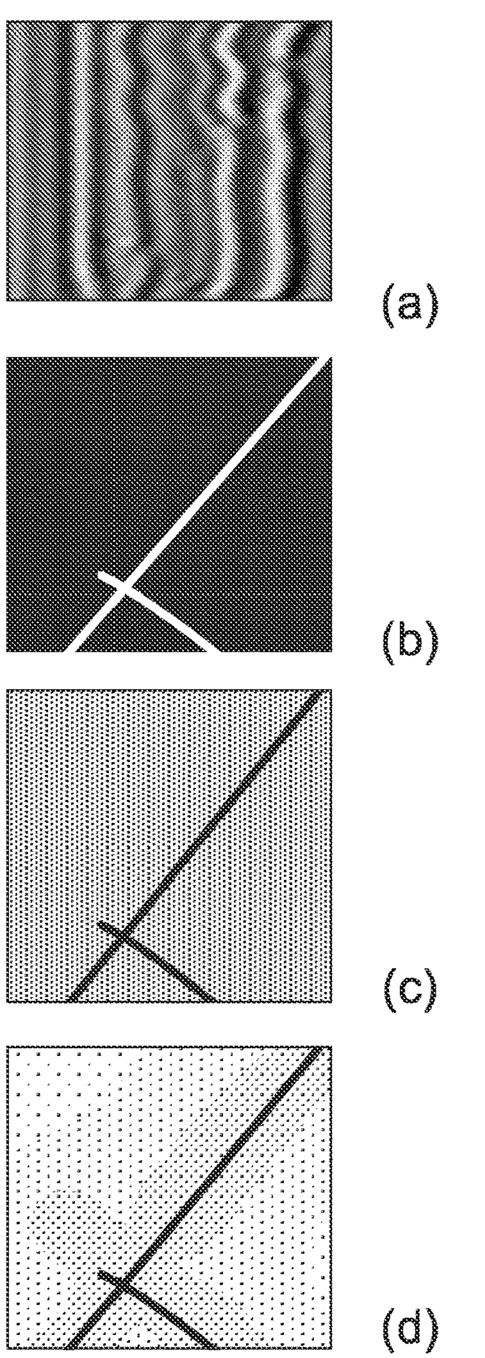
FIG. 17 shows an example illustration of applying distance loss scores to seismic data including faults, where (a) is the seismic data with faults, (b) is an image of depicted labelled faults, (c) is an image of a 'not feature' error value at the location of the faults, (d) is an image of a 'feature' error value away from the labelled faults, and (e) is an image illustrating increasing values of a labelled 'feature' class (e.g. fault) and an interpreted line.
Figure 17:
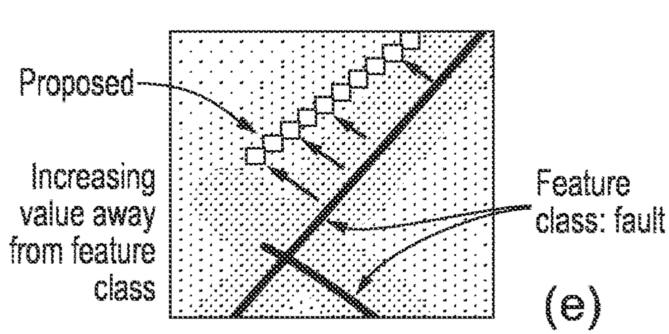

In addition, calculation of the Distance Loss involves generating scores for both 'Known' labels, i.e. "Feature" and "Not Feature". Such scores can be visualised as a Feature Distance Map ($b_n$) as illustrated in FIGS. 17 (*a*) to (*e*). Scores are generated by firstly creating a binary image chunk $b_n$ for each labelled feature (n), then the binary information is used to calculate negative and positive values that form two Feature Distance maps (see, in particular, FIGS. 17(*c*) and 17(*d*), respectively).

The first Feature Distance map (i.e. FIG. 17(*c*)) is derived by calculating the distance transform (i.e. logical NOT $b_n$). The score of incorrectly predicting a "Not Feature" at the location of a fault produces a negative value.

The second Feature Distance map (i.e. FIGS. 17(*d*) and 17(*e*)) is generated by calculating the distance transform of each voxel to the nearest voxel of its feature class. Finally, these maps are normalised according to the ratio between the feature and non-feature classes.

This Distance Loss is then applied by using the corresponding score from the Feature Distance map for any incorrectly labelled voxels. The score can be dynamically adjusted at run time across a whole chunk, so as to allow varying strictness of labels or balance of labels by raising the Feature Distance maps to a power.

Alterative Embodiments

Network Architecture

The disclosed example uses a VGG Deep Learning (DL) network as a base ANN network architecture. However, the present invention also supports any other fully convolutional network (FCN) architecture (that is suited to freezing layers), such as, but not limited to, AlexNet, GoogleNet, ResNet.

Further, the present example embodiment describes an optional extension to a FCN to produce separable outputs. An alternative embodiment to this may be to produce separate 2D and 3D networks. For example, a 2D network that has been trained on 2D slices could predict the location of faults on 2D slices. The interpreter could then add to or edit auto-generated fault sticks from the 2D network prediction. Using partial labelling, the edited fault sticks could fine-tune the 3D network that had been initially trained on 3D cubes. This alternative embodiment may also be applicable to other geological features or attributes.

Ensemble Deep Learning Network

Although a single Deep Learning (DL) network has been described for the example embodiment of the present invention, a plurality of Deep Learning (DL) networks may be used within the scope of the present invention. When using a plurality of DL networks, a single ANN network architecture can be trained using a different subset of the training data, or different architectures can be utilized. In both situations, a level of confidence can be obtained and expressed where the results from each ANN network correlate. For example, if five Deep Learning (DL) networks return probabilities for a certain geological feature, the probabilities from each ANN network can be averaged. Alternatively, each one of the plurality of ANN networks may "vote".

Input Data

In the disclosed example embodiment of the present invention, the Deep Learning (DL) network is trained using 2D and/or 3D synthetic seismic data. However, other forms of data may be used for training. A Deep Learning (DL) network may be trained with purely synthetic data, actual data, or a combination of the two. The actual data may include, but is not limited to, 4D (i.e. time lapse) seismic data, frequency data (spectral decomposition—magnitude volumes) and seismic attributes. Thus, combination of data may be used with the method of the present invention.

Computational Platform

The disclosed example embodiment is based on the data-set batch size that can be trained on a single GPU. However, the present invention may also run on multiple-GPU configurations or computational equivalents.

Seismic Interpretation

The disclosed example embodiment describes how the invention can be used to predict the location of faults from seismic data. However, the location of any other geological feature may be predicted, such as, for example, horizons and geobodies (e.g. salt, karsts, clinoforms and others) using height maps and polygons, respectively, for labelling purposes.

Assessment of Results

Figure 18:
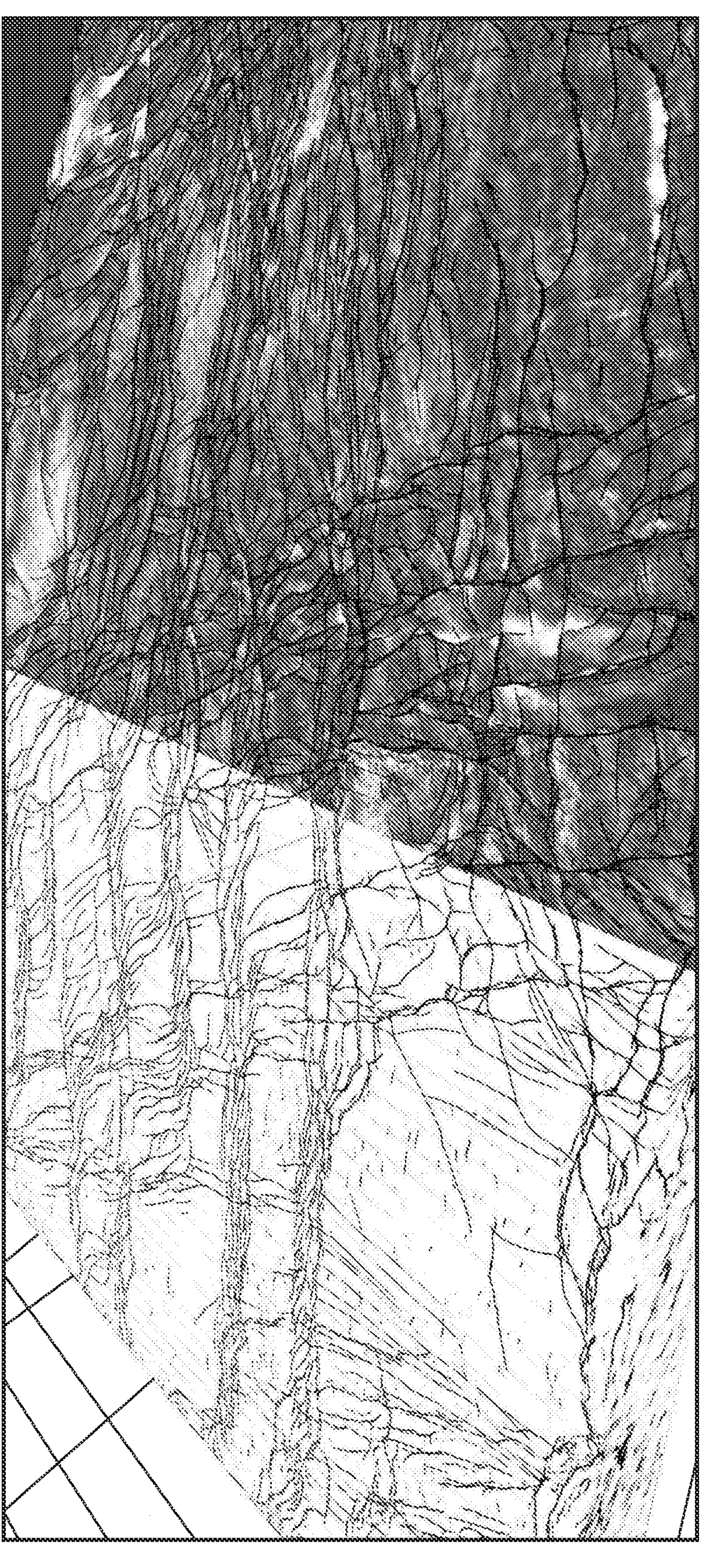
FIG. 18 shows an example illustration of a resulting visual representation of the ANN output comparing the Deep Learning (DL) results (i.e. faults) with an RGB blend.

To allow the interpreter to assess the quality of the Deep Learning (DL) results quickly, e.g. for comparison purposes, the ANN network output may be considered in relation to a frequency RGB blend. An illustration of such an output is shown in FIG. 18. The Deep Learning (DL) results may be produced from a single ANN network or a plurality of ANN networks.

As the Deep Learning (DL) results and the spectral decomposition results are each derived from different mathematical functions, the interpreter may use visual inspection to compare the results. Alternatively, or additionally, appropriate statistically based comparisons may be undertaken, preferably with elimination of spatial autocorrelation effects. In the described example embodiment, visual inspection shows that colour changes (i.e. in the RGB blend) closely coincide with geological feature boundaries predicted by the Deep Learning (DL) network.

It will be appreciated by persons skilled in the art that the above embodiment(s) have been described by way of example only and not in any limitative sense, and that various alterations and modifications are possible without departing from the scope of the invention as defined by the appended claims.

The invention claimed is:

1. A computer-implemented method for interpreting geophysical data utilising an Artificial Neural Network (ANN), performed by electronic operations executed by a computing device, comprising:

performing a training processing step on at least one training-data set, comprising the steps of:

(a) generating a first label-data by segmenting said at least one training-data set into different separate regions of at least a first region, representing a known first region having at least one identified geological feature, and a second region, representing a known second region having at least one unidentified geological feature, and a third region, representing an unknown region, wherein said first, second and third regions are non-overlapping and wherein said third region comprises unlabelled voxels, and generating at least one dynamic score for each voxel of said first label-data, each dynamic score corresponding to a distance value from any one of said at least one identified geological feature;

(b) generating a first ANN model output for a dynamically adaptable Region of Interest (ROI) of said first label-data, said dynamically adaptable ROI including said first and second region but ignoring or excluding said third region, wherein said at least one dynamic score defines a distance-based loss metric applied during training of said ANN so as to weight a training error according to said distance value;

(c) generating an updated label-data by selecting at least a first portion of any one of said first, second and third region, and assigning and appending at least said first portion to any one of said first, second and third region;

(d) generating an updated ANN model output for an updated dynamically adaptable ROI of said updated label-data by retraining said ANN using an updated distance-based loss metric corresponding to updated dynamic scores of said updated label-data;

(e) repeating steps (c) and (d) until a predetermined condition is met, providing a final ANN model output, wherein the predetermined condition comprises at least one of a predetermined number of reiterations or a quality parameter of said ANN indicative of convergence of said training;

applying said final ANN model output to a seismic target-data set obtained from a seismic survey of a subterranean volume utilising said ANN, generating a desired output data comprising a voxelwise visual representation of said at least one identified geological feature in said subterranean volume.

2. A computer-implemented method according to claim 1, wherein step (a) includes sub-step (a-i), generating at least one dynamic score for each one of said first label-data, each one corresponding to a distance value from any one of said at least one identified geological feature.

3. A computer-implemented method according to claim 2, wherein step (b) includes generating a first ANN model output utilising corresponding said at least one dynamic score of said first label-data.

4. A computer-implemented method according to claim 2, wherein step (c) includes sub-step (c-i), generating at least one updated dynamic score for each one of said updated label-data, said at least one updated dynamic score is optimised with respect to said updated label-data.

5. A computer-implemented method according to claim 4, wherein step (d) includes generating an updated ANN model output utilising said at least one updated dynamic score of corresponding said updated label-data.

6. A computer-implemented method according claim 1, wherein said ANN is adapted to ignore said third region when generating any one of said first-, updated- and final ANN model output.

7. A computer-implemented method according to claim 1, wherein said ANN is adapted to utilise label-data from said third region when generating any one of said first-, updated and final ANN model output.

8. A computer-implemented method according to claim 1, wherein said geophysical data comprises seismic data.

9. A computer-implemented method according to claim 1, wherein said at least one training-data set comprises any one or any combination of synthetic and real data.

10. A computer-implemented method according to claim 1, wherein predetermined condition is any one of a user input, a predetermined number of reiterations of steps (c) and (d), and a predetermined threshold parameter of said ANN.

11. A computer-implemented method according to claim 10, wherein said predetermined threshold parameter of said ANN is a quality parameter of said updated ANN model output.

12. A computer-implemented method according to claim 1, wherein said desired output data is configured to provide a visual representation of said at least one identified geological feature identified in said seismic target-data set.

13. A computer-implemented method according to claim 1, wherein said ANN is a Convolutional Neural Network (CNN).

14. A computer-implemented method according to claim 1, wherein said at least one identified geological feature and said at least one unidentified geological feature comprises any one of at least one fault, horizon and geobody.

15. A system for interpreting geophysical data utilising an Artificial Neural Network (ANN), comprising:

a computer processor;

memory storing instructions executed by said computer processor, wherein said memory storing instructions comprise functionality to perform operations according to the method of claim 1, and a display device for rendering an output data to provide a visual representation of at least one identified geological feature identified in a seismic target-data set obtain from a seismic survey.

16. A non-transitory machine readable medium, including instruction, which when executed by a machine having at least one computer processor, causes the machine to perform operations according to the method of claim 1.

* * * * *